United States Patent
Li et al.

(10) Patent No.: US 10,101,841 B2
(45) Date of Patent: Oct. 16, 2018

(54) ELECTRONIC DEVICE DIAGNOSTICS USING FORCE SENSING ASSEMBLIES

(71) Applicant: Apple Inc., Cupertino, CA (US)

(72) Inventors: Mo Li, Campbell, CA (US); Steven J. Banaska, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/257,671

(22) Filed: Sep. 6, 2016

(65) Prior Publication Data
US 2018/0067600 A1   Mar. 8, 2018

(51) Int. Cl.
G01M 99/00 (2011.01)
G06F 3/041 (2006.01)
G01L 25/00 (2006.01)
G01L 1/14 (2006.01)
G06F 11/22 (2006.01)
G06F 3/044 (2006.01)

(52) U.S. Cl.
CPC ............ G06F 3/0414 (2013.01); G01L 1/146 (2013.01); G01L 25/00 (2013.01); G06F 3/0418 (2013.01); G06F 11/2221 (2013.01); G06F 3/044 (2013.01)

(58) Field of Classification Search
CPC ..... G06F 3/0414; G01L 25/00; G01L 25/006; G01L 27/00; G01L 27/007; G01L 1/146; G01P 21/00; G01C 25/00; G01C 25/005; G01M 99/005
USPC ............ 73/1.08–1.15, 1.37–1.41, 1.75–1.81
See application file for complete search history.

(56) References Cited

U.S. PATENT DOCUMENTS

2016/0378255 A1* 12/2016 Butler ................... G01L 1/146
345/174

* cited by examiner

Primary Examiner — Robert R Raevis
(74) Attorney, Agent, or Firm — Van Court & Aldridge LLP

(57) ABSTRACT

Systems, methods, and computer-readable media for diagnosing an electronic device using a force sensing assembly are provided.

20 Claims, 14 Drawing Sheets
(5 of 14 Drawing Sheet(s) Filed in Color)

300

200

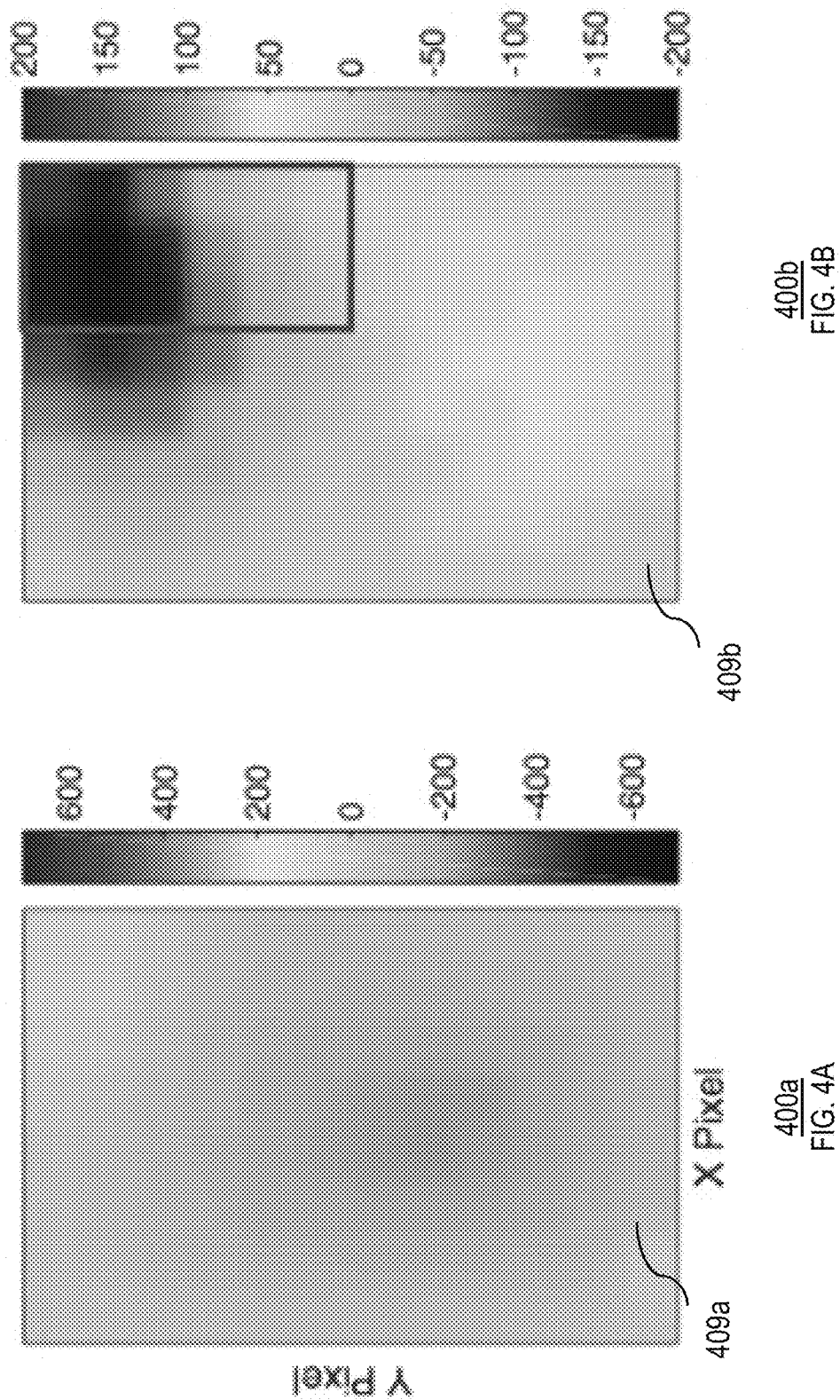

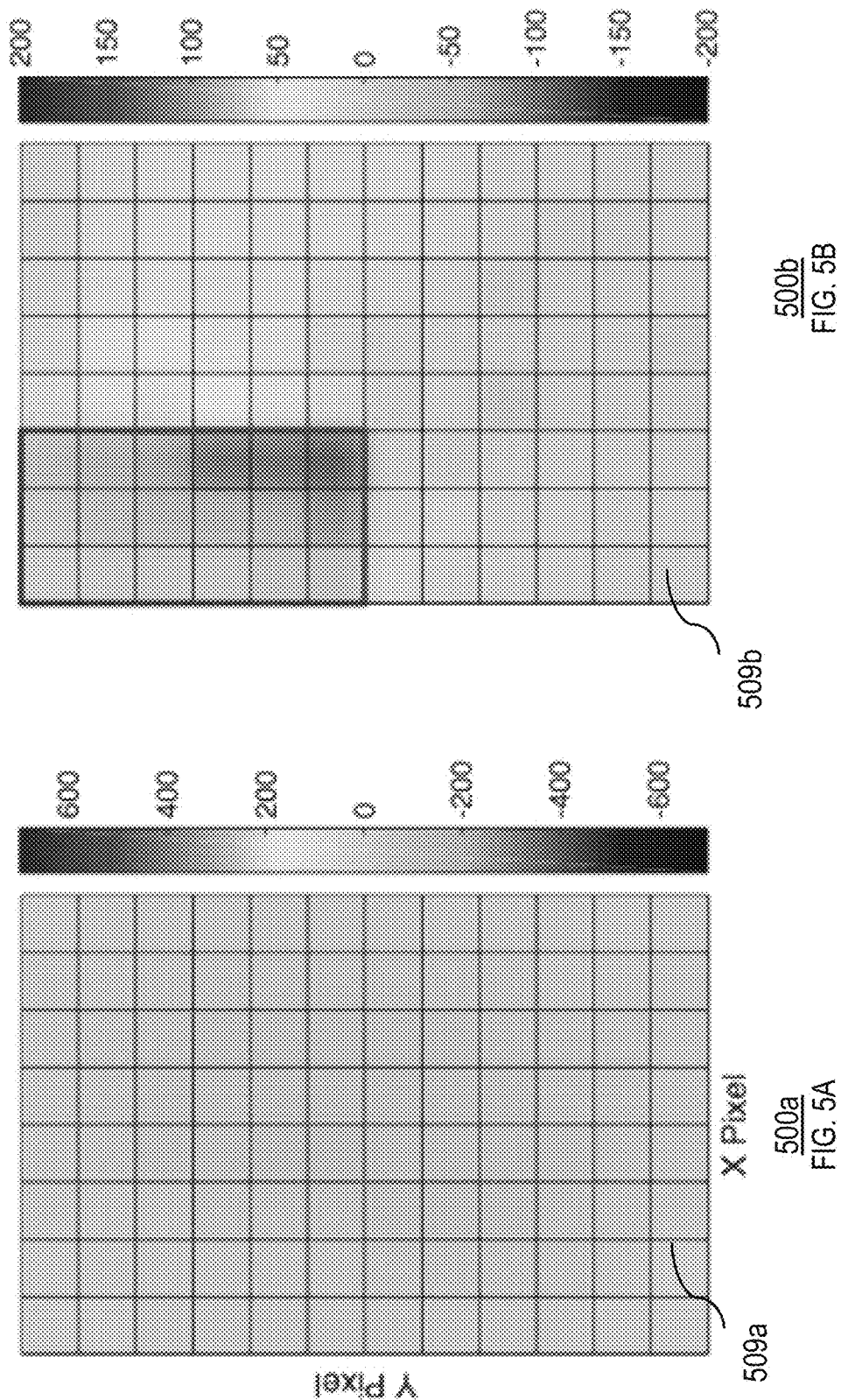

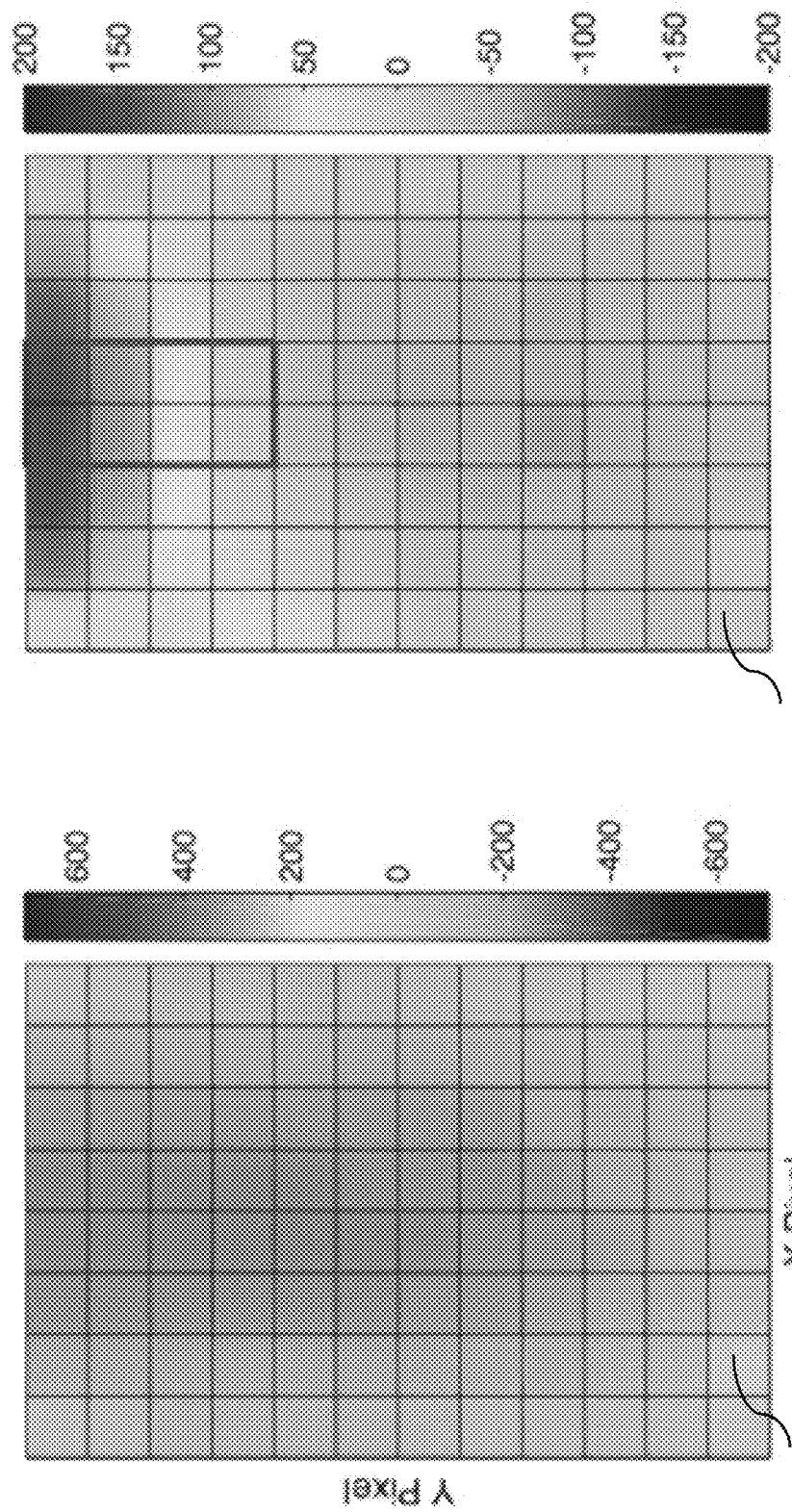

900

800

OBTAIN A FIRST DEVICE UNDER TEST ("DUT") DEVICE DIAGNOSTIC DATA SET INCLUDING FIRST DUT FORCE SENSING MEASUREMENT DATA FROM EACH FORCE SENSOR OF A FORCE SENSOR ARRAY OF A FORCE SENSING ASSEMBLY OF A DUT ELECTRONIC DEVICE IN A FIRST DUT DEVICE CONDITION, WHEREIN THE FIRST DUT DEVICE CONDITION INCLUDES THE FORCE SENSING ASSEMBLY OF THE DUT ELECTRONIC DEVICE BEING ORIENTED AT A FIRST ANGLE WITH RESPECT TO GRAVITY
1102

OBTAIN A SECOND DUT DEVICE DIAGNOSTIC DATA SET INCLUDING SECOND DUT FORCE SENSING MEASUREMENT DATA FROM EACH FORCE SENSOR OF THE FORCE SENSOR ARRAY OF THE FORCE SENSING ASSEMBLY OF THE DUT ELECTRONIC DEVICE IN A SECOND DUT DEVICE CONDITION, WHEREIN THE SECOND DUT DEVICE CONDITION INCLUDES THE FORCE SENSING ASSEMBLY OF THE DUT ELECTRONIC DEVICE BEING ORIENTED AT A SECOND ANGLE WITH RESPECT TO GRAVITY THAT IS DIFFERENT THAN THE FIRST ANGLE BY A DUT DEVICE DIFFERENCE
1104

OBTAIN A DELTA DUT DEVICE DIAGNOSTIC DATA SET INCLUDING THE DIFFERENCE BETWEEN THE FIRST DUT DEVICE DIAGNOSTIC DATA SET AND THE SECOND DUT DEVICE DIAGNOSTIC DATA SET
1106

DIAGNOSE THE DUT ELECTRONIC DEVICE USING THE DELTA DUT DEVICE DIAGNOSTIC DATA SET
1108

1100
FIG. 11

ELECTRONIC DEVICE DIAGNOSTICS USING FORCE SENSING ASSEMBLIES

TECHNICAL FIELD

This disclosure relates to force sensing assemblies and, more particularly, to force sensing assemblies being used to diagnose electronic devices.

BACKGROUND OF THE DISCLOSURE

An electronic device (e.g., a laptop computer, a cellular telephone, etc.) may be provided with a force sensing assembly to detect an amount of force being applied on the electronic device by a user. However, heretofore, such a force sensing assembly has not been used to diagnose problems with the electronic device.

SUMMARY OF THE DISCLOSURE

This document describes systems, methods, and computer-readable media for diagnosing an electronic device using a force sensing assembly.

For example, a method for diagnosing a device under test ("DUT") electronic device using a force sensing assembly of the DUT electronic device is provided that may include obtaining a device diagnostic data set including force sensing measurement data from each force sensor of a force sensor array of the force sensing assembly of the DUT electronic device in a device condition, obtaining a golden diagnostic data set including force sensing measurement data from each force sensor of a force sensor array of a force sensing assembly of a golden unit electronic device in a golden condition, calculating a golden correlation factor between the device diagnostic data set and the golden diagnostic data set, when the golden correlation factor is less than a threshold value, calculating a DUT residual diagnostic data set between the device diagnostic data set and the golden diagnostic data set, for each one of a plurality of diagnosed electronic devices properly diagnosed with a particular respective device issue: (1) obtaining a diagnosed device diagnostic data set including force sensing measurement data from each force sensor of a force sensor array of a force sensing assembly of the diagnosed electronic device, (2) calculating a diagnosed residual diagnostic data set between the diagnosed device diagnostic data set and the golden diagnostic data set, and (3) linking the diagnosed residual diagnostic data set with an identification of the device issue of the diagnosed electronic device, calculating a plurality of residual correlation factors, wherein each residual correlation factor is calculated between the DUT residual diagnostic data set and the diagnosed residual diagnostic data set of a respective diagnosed electronic device, identifying the device issue linked to the diagnosed residual diagnostic data set used to calculate the largest residual correlation factor of the plurality of residual correlation factors, and diagnosing the DUT electronic device with the identified device issue.

As another example, a method for diagnosing a device under test ("DUT") electronic device using a force sensing assembly of the DUT electronic device is provided that may include obtaining a first DUT device diagnostic data set including first DUT force sensing measurement data from each force sensor of a force sensor array of the force sensing assembly of the DUT electronic device in a first DUT device condition, wherein the first DUT device condition includes the force sensing assembly of the DUT electronic device being oriented at a first angle with respect to gravity, obtaining a second DUT device diagnostic data set including second DUT force sensing measurement data from each force sensor of the force sensor array of the force sensing assembly of the DUT electronic device in a second DUT device condition, wherein the second DUT device condition includes the force sensing assembly of the DUT electronic device being oriented at a second angle with respect to gravity that is different than the first angle by a DUT device difference, obtaining a delta DUT device diagnostic data set including the difference between the first DUT device diagnostic data set and the second DUT device diagnostic data set, and diagnosing the DUT electronic device using the delta DUT device diagnostic data set.

As yet another example, a method for diagnosing a device under test ("DUT") electronic device using a force sensing assembly of the DUT electronic device is provided that may include obtaining a DUT device diagnostic data set including force sensing measurement data from each force sensor of a force sensor array of the force sensing assembly of the DUT electronic device in a DUT device condition, for each one of a plurality of diagnosed electronic devices properly diagnosed with a particular respective device issue: (1) obtaining a diagnosed device diagnostic data set including force sensing measurement data from each force sensor of a force sensor array of a force sensing assembly of the diagnosed electronic device and (2) linking the obtained diagnosed device diagnostic data set with an identification of the device issue of the diagnosed electronic device, calculating a plurality of diagnostic correlation factors, wherein each diagnostic correlation factor of the plurality of diagnostic correlation factors is calculated between the DUT device diagnostic data set of the DUT electronic device and the diagnosed device diagnostic data set of a respective diagnosed electronic device, identifying the device issue linked to the diagnosed device diagnostic data set used to calculate the largest diagnostic correlation factor of the plurality of diagnostic correlation factors, and diagnosing the DUT electronic device with the identified device issue.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

It is noted that the U.S. patent or patent application file contains at least one drawing executed in color. Copies of this patent or patent application publication with color drawings will be provided by the U.S. Patent Office upon request and payment of the necessary fee. The above and other objects and advantages of the inventive embodiments will be apparent upon consideration of the following detailed description, taken in conjunction with the accompanying drawings, in which like reference characters refer to like parts throughout, and in which:

FIGS. 3-7B are two-dimensional maps of illustrative data defined by force sensing measurements, in accordance with some embodiments;

FIGS. 10-12 are flowcharts of illustrative processes for diagnosing an electronic device using a force sensing assembly.

DETAILED DESCRIPTION OF THE DISCLOSURE

Systems, methods, and computer-readable media may be provided for diagnosing an electronic device using a force sensing assembly. Force sensor assembly data obtained from a device under test ("DUT") device at one or more orientations may be compared to similar data from a golden unit in order to diagnose the DUT device. Such force sensor assembly data of the DUT device may be used as a sort of X-ray into the DUT device to reveal mechanical issues that may exist within a housing of the DUT device but that may not be apparent to an observer of the DUT device.

Figure 1:
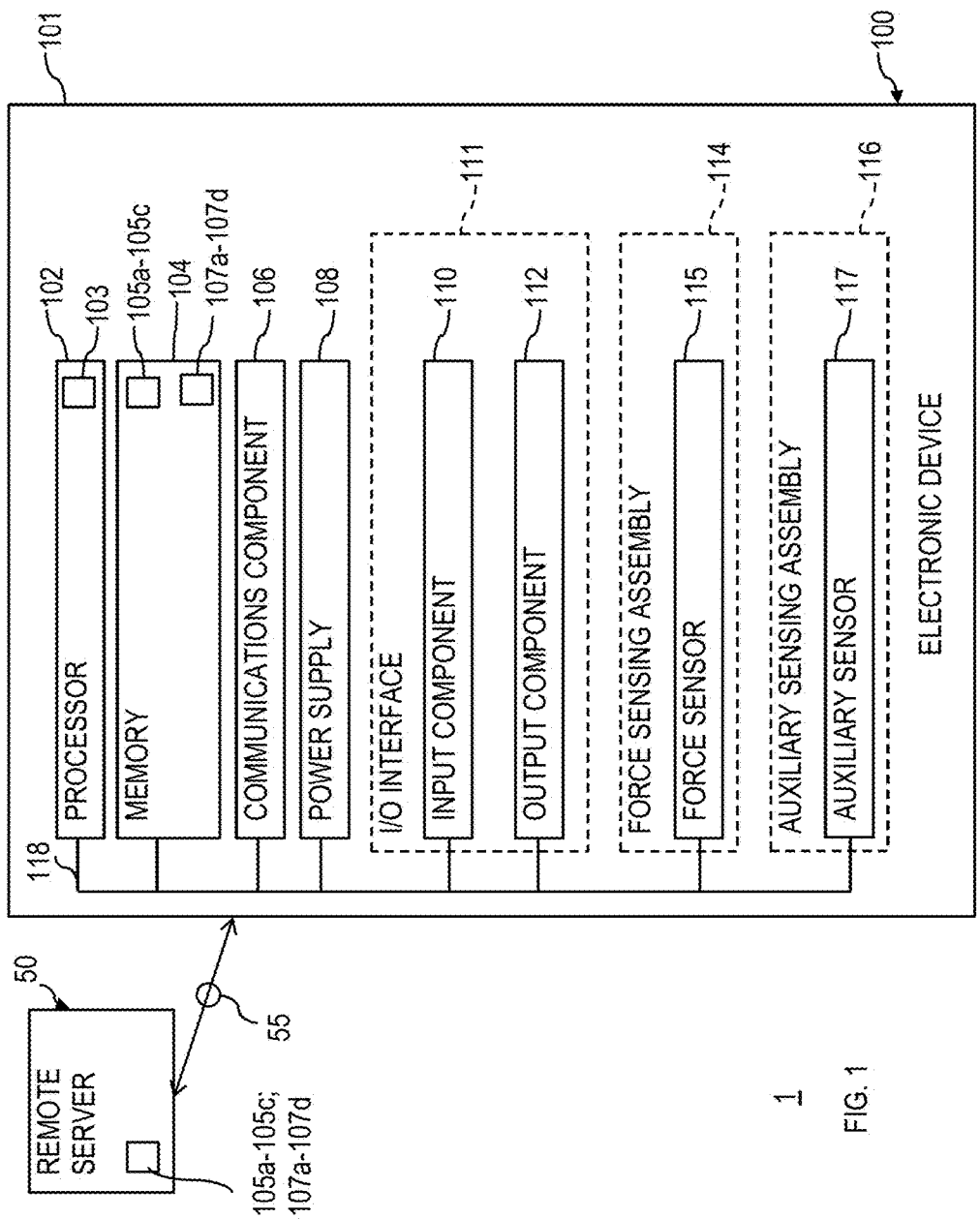
FIG. 1 is a schematic view of an illustrative system including an electronic device with a force sensing assembly, in accordance with some embodiments.

FIG. 1 is a schematic view of a system 1 with an illustrative electronic device 100 that may include a force sensing assembly. Electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop (e.g., an iMac™ available by Apple Inc.), laptop (e.g., a MacBook™ available by Apple Inc.), tablet (e.g., an iPad™ available by Apple Inc.), server, etc.), monitor, television, stereo equipment, set up box, set-top box, boom box, modem, router, printer, or any combination thereof. In some embodiments, electronic device 100 may perform a single function (e.g., a device dedicated to sensing a user force) and, in other embodiments, electronic device 100 may perform multiple functions (e.g., a device that senses a user force, plays music, and receives and transmits telephone calls).

Electronic device 100 may be any portable, mobile, hand-held, or miniature electronic device that may be configured to sense a user's force wherever a user travels. Some miniature electronic devices may have a form factor that is smaller than that of hand-held electronic devices, such as an iPod™. Illustrative miniature electronic devices can be integrated into various objects that may include, but are not limited to, watches (e.g., an Apple Watch™ available by Apple Inc.), rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

As shown in FIG. 1, for example, electronic device 100 may include a processor 102, memory 104, a communications component 106, a power supply 108, an input component 110, an output component 112, a force sensing assembly 114, and an auxiliary sensing assembly 116. Electronic device 100 may also include a bus 118 that may provide one or more wired or wireless communication links or paths for transferring data and/or power to, from, or between various other components of device 100. In some embodiments, one or more components of electronic device 100 may be combined or omitted. Moreover, electronic device 100 may include any other suitable components not combined or included in FIG. 1 and/or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated onto one or more suitable types of components that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, pass information (e.g., transportation boarding passes, event tickets, coupons, store cards, financial payment cards, etc.), any suitable device calibration data (e.g., data 105a), any suitable calibration model data (e.g., data 105b), any suitable transfer function data (e.g., data 105c), any suitable device diagnostic data (e.g., data 107a), any suitable golden diagnostic data (e.g., data 107b), any suitable threshold correlation factor values (e.g., data 107c), any suitable diagnosed residual data set data (e.g., data 107d), any other suitable data, or any combination thereof.

Communications component 106 may be provided to allow device 100 to communicate with one or more other electronic devices or servers of system 1 (e.g., data source or data processor or server 50, which may include similar components to that of device 100) using any suitable communications protocol. For example, communications component 106 may support Wi-Fi™ (e.g., an 802.11 protocol), ZigBee™ (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoWPAN") module, any other communications protocol, or any combination thereof. Communications component 106 may also include or may be electrically coupled to any suitable transceiver circuitry that can enable device 100 to be communicatively coupled to another device (e.g., a server, host computer, scanner, accessory device, etc.), such as server 50, and communicate data 55 with that other device wirelessly, or via a wired connection (e.g., using a connector port). Communications component 106 may be configured to determine a geographical position of electronic device 100 and/or any suitable data that may be associated with that position. For example, communications component 106 may utilize a global positioning system ("GPS") or a regional or site-wide positioning system that may use cell tower positioning technology or Wi-Fi™ technology, or any suitable location-based service or real-time locating system, which may leverage a geo-fence for providing any suitable location-based data to device 100. As described below in more detail, system 1 may include any suitable remote entity or data source, such as server 50, that may be configured to communicate any suitable data 55 with electronic device 100 (e.g., via communications component 106) using any suitable communications protocol and/or any suitable communications medium.

Power supply 108 may include any suitable circuitry for receiving and/or generating power, and for providing such power to one or more of the other components of electronic device 100. For example, power supply 108 can be coupled to a power grid (e.g., when device 100 is not acting as a portable device or when a battery of the device is being charged at an electrical outlet with power generated by an electrical power plant). As another example, power supply 108 may be configured to generate power from a natural source (e.g., solar power using solar cells). As another example, power supply 108 can include one or more batteries for providing power (e.g., when device 100 is acting as a portable device). For example, power supply 108 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise). The power can be provided by power supply 108 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply 108 can be operative to request or provide particular amounts of power at different times, for example, based on the needs or requirements of electronic device 100 or periphery devices that may be coupled to electronic device 100 (e.g., to request more power when charging a battery than when the battery is already charged).

One or more input components 110 may be provided to permit a user or device environment to interact or interface with device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, scanner (e.g., a barcode scanner or any other suitable scanner that may obtain product identifying information from a code, such as a linear barcode, a matrix barcode (e.g., a quick response ("QR") code), or the like), proximity sensor, light detector, biometric sensor (e.g., a fingerprint reader or other feature recognition sensor, which may operate in conjunction with a feature-processing application that may be accessible to electronic device 100 for authenticating a user), line-in connector for data and/or power, and combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. For example, output component 112 of electronic device 100 may take various forms, including, but not limited to, audio speakers, headphones, line-out connectors for data and/or power, visual displays (e.g., for transmitting data via visible light and/or via invisible light), infrared ports, flashes (e.g., light sources for providing artificial light for illuminating an environment of the device), tactile/haptic outputs (e.g., rumblers, vibrators, etc.), and combinations thereof. As a specific example, electronic device 100 may include a display assembly output component as output component 112, where such a display assembly output component may include any suitable type of display or interface for presenting visual data to a user with visible light. A display assembly output component may include a display embedded in device 100 or coupled to device 100 (e.g., a removable display). A display assembly output component may include, for example, a liquid crystal display ("LCD"), which may include any suitable backlight or other light source that may or may not use one or any other suitable number of light emitting diodes ("LEDs"), a light emitting diode ("LED") display, a plasma display, an organic light-emitting diode ("OLED") display, a micro-LED display, a nano-LED display, a surface-conduction electron-emitter display ("SED"), a carbon nanotube display, a nanocrystal display, any other suitable type of display, or combination thereof. Alternatively, a display assembly output component can include a movable display or a projecting system for providing a display of content on a surface remote from electronic device 100, such as, for example, a video projector, a head-up display, or a three-dimensional (e.g., holographic) display. As another example, a display assembly output component may include a digital or mechanical viewfinder, such as a viewfinder of the type found in compact digital cameras, reflex cameras, or any other suitable still or video camera. A display assembly output component may include display driver circuitry, circuitry for driving display drivers, or both, and such a display assembly output component can be operative to display content (e.g., media playback information, application screens for applications implemented on electronic device 100, information regarding ongoing communications operations, information regarding incoming communications requests, device operation screens, etc.) that may be under the direction of processor 102. In some embodiments, a display assembly output component may include a single or only a few light sources (e.g., one or a few LEDs) that may provide sufficient light for enabling a multi-pixel display and/or that may provide a single display object (e.g., an illuminated logo or status light) when a single light source shines through a light-transmissive portion of housing 101 of device 100.

It should be noted that one or more input components and one or more output components may sometimes be referred to collectively herein as an input/output ("I/O") component or I/O interface (e.g., input component 110 and output component 112 as I/O component or I/O interface 111). For example, input component 110 and output component 112 may sometimes be a single I/O interface 111, such as a touch screen, that may receive input information through a user's touch of a display screen and that may also provide visual information to a user via that same display screen.

Moreover, force sensing assembly 114 may include one or more force sensor components or force sensors 115 that can be provided to detect one or more force characteristics related to a condition of one or more electronic components or areas of electronic device 100, where such a detected force characteristic may be utilized for at least partially controlling a functionality of electronic device 100, such as to diagnose electronic device 100 and/or determine a user input event at electronic device 100. For example, force sensing assembly 114 may take one of various forms, including, but not limited to, any suitable capacitive sensors, pressure sensors, strain gauges, sensing plates (e.g., capacitive and/or strain sensing plates), and any combinations thereof. For example, processor 102 may be configured to read data force sensing assembly 114 in order to determine a type and/or magnitude of force applied on or by any suitable portion of electronic device 100, and the like. In some embodiments, force sensing assembly 114 may include at least two force sensor components 115, such as a first force sensor and a second force sensor, where the two or more sensor components 115 of force sensing assembly 114 may be leveraged together by device 100 to measure one or more particular force properties of device 100 in a more efficient or otherwise improved manner than may be possible by leveraging only a single one of such sensor components to do such measuring. Any sensor component 115 of force sensing assembly 114 may be positioned at any suitable location at least partially within or on an external surface of a housing 101 of device 100. Electronic device 100 may be configured to leverage data (e.g., force data) detected by force sensing assembly 114 to provide robust and intelligent diagnostics of electronic device 100 (e.g., to facilitate proper repair of device 100).

Moreover, auxiliary sensing assembly 116 may include one or more auxiliary sensors 117 that can be provided to detect one or more auxiliary characteristics related to a current operation, performance, or environmental condition of one or more electronic components or areas of electronic device 100, where such a detected characteristic may be utilized for at least partially controlling a functionality of electronic device 100, such as the calibration of force sensing assembly 114 and/or diagnostics of electronic device 100 and/or detection of an input event at electronic device 100. For example, each auxiliary sensor 117 of auxiliary sensing assembly 116 may take one of various forms, including, but not limited to, any suitable temperature sensor (e.g., thermistor, thermocouple, thermometer, silicon bandgap temperature sensor, bimetal sensor, etc.) for detecting the temperature of a portion of electronic device 100, a performance analyzer for detecting an application characteristic related to the current operation of one or more components of electronic device 100 (e.g., processor 102), one or more motion sensors, such as single-axis or multi-axis accelerometers, angular rate or inertial sensors (e.g., optical gyroscopes, vibrating gyroscopes, gas rate gyroscopes, or ring gyroscopes), linear velocity sensors, and/or the like, one or more magnetometers (e.g., scalar or vector magnetometers), pressure sensors, light sensors (e.g., ambient light sensors ("ALS"), infrared ("IR") sensors, etc.), thermal sensors, microphones, proximity sensors, capacitive proximity sensors, acoustic sensors, sonic or sonar sensors, radar sensors, image sensors, video sensors, global positioning system ("GPS") detectors, radio frequency ("RF") detectors, RF or acoustic Doppler detectors, RF triangulation detectors, electrical charge sensors, peripheral device detectors, event counters, and any combinations thereof. For example, processor 102 may be configured to read data from one or more auxiliary sensors 117 of auxiliary sensing assembly 116 in order to determine the orientation or velocity of electronic device 100, and/or the amount or type of light, heat, or sound that device 100 is being exposed to, the load or amount of power being used by one or more components of device 100, and the like. In some embodiments, auxiliary sensing assembly 116 may include at least two auxiliary sensor components 117, such as a first orientation sensor and a second orientation sensor, where the two or more sensor components 117 of auxiliary sensing assembly 116 may be leveraged together by device 100 to measure one or more particular properties of device 100 in a more efficient or otherwise improved manner than may be possible by leveraging only a single one of such sensor components to do such measuring. Each sensor component 117 of auxiliary sensing assembly 116 may be positioned at any suitable location at least partially within or on an external surface of a housing 101 of device 100. Electronic device 100 may be configured to leverage data (e.g., orientation data) detected by one or more sensor components 117 of auxiliary sensing assembly 116 together with force data determined from force sensor assembly 114 to provide robust and intelligent diagnostics of electronic device 100.

Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 1, processor 102 may be used to run one or more applications, such as an application 103. Application 103 may include, but is not limited to, one or more operating system applications, firmware applications, media playback applications, media editing applications, pass applications, calendar applications, state determination applications, biometric feature-processing applications, compass applications, health applications, thermometer applications, weather applications, thermal management applications, force sensing applications, device diagnostic applications, video game applications, or any other suitable applications. For example, processor 102 may load application 103 as a user interface program to determine how instructions or data received via an input component 110 and/or any other component of device 100 (e.g., data via force sensing assembly 114, data via auxiliary sensing assembly 116, etc.) may manipulate the one or more ways in which information may be stored and/or provided to the user via an output component 112. As another example, processor 102 may load application 103 as a background application program or a user-detectable application program (e.g., as a device diagnostic program (e.g., closed loop device diagnostic software with finite element simulation)) to determine how device characteristic data received via any suitable component and/or combination of components of device 100 (e.g., force data from force sensing assembly 114 and/or orientation or other operational characteristic data from auxiliary sensing assembly 116 and/or data from server 50 and/or the like) may be stored and/or otherwise used to diagnose device 100 and/or to control or manipulate at least one functionality of device 100 (e.g., a performance or mode of electronic device 100 may be altered (e.g., terminated)) based on the diagnosis of one or more portions of device 100 (e.g., when a battery has been diagnosed as swollen (e.g., beyond a certain threshold)). Application 103 may be accessed by processor 102 from any suitable source, such as from memory 104 (e.g., via bus 118) or from another device or server (e.g., server 50 or any other suitable remote source via communications component 106). Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

Figure 9:
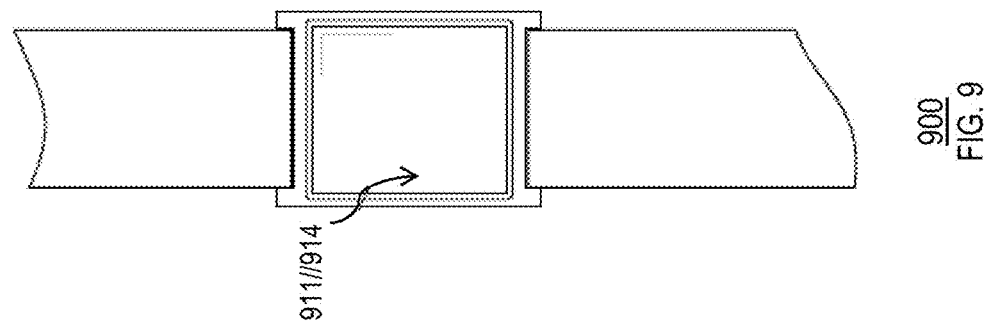
FIG. 9 is a top view of yet another electronic device with a force sensing assembly, in accordance with some embodiments.
Figure 8:
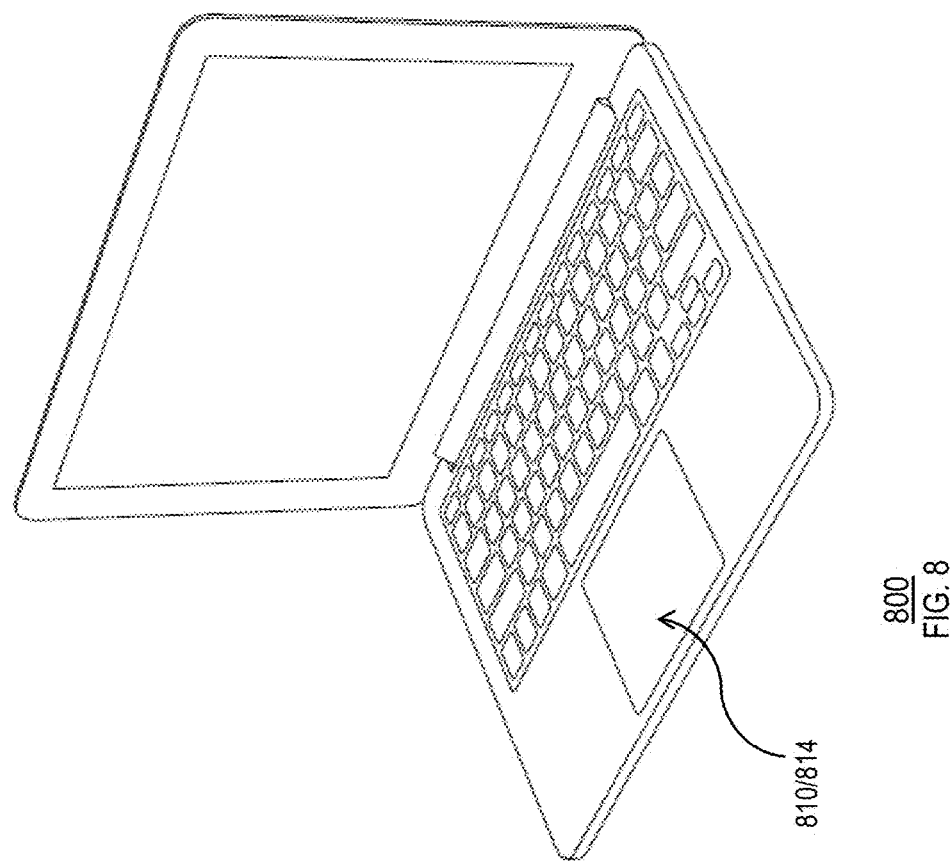
FIG. 8 is a front, right, top perspective view of another electronic device with a force sensing assembly, in accordance with some embodiments.

FIGS. 1A-1E are various views of various portions of electronic device 100 in accordance with some embodiments, where electronic device 100 may be a mobile computing device (e.g., a smart phone) that may include a force sensing assembly 114 at least partially combined with or incorporated into or positioned to work with a touch screen I/O interface 111a, which may include a touch assembly input component 110a and a display assembly output component 112a, where force sensing assembly 114 may be configured to detect force inputs on an input surface of I/O interface 111a. As also shown in FIGS. 1A-1E, electronic device 100 may also include a button assembly input component 110b and an audio speaker assembly output component 112b, where housing 101 may be configured to at least partially enclose each of the components of device 100. Housing 101 may be any suitable shape and may include any suitable number of walls. In some embodiments, as shown in FIGS. 1A-1E, for example, housing 101 may be of a generally hexahedral shape and may include a top wall 101t, a bottom wall 101b that may be opposite top wall 101t, a left wall 101l, a right wall 101r that may be opposite left wall 101l, a front wall 101f, and a back wall 101k that may be opposite front wall 101f, where at least a portion of force sensing assembly 114 and touch screen I/O interface 111a may be at least partially exposed to the external environment via an opening 109a through front wall 101f, where at least a portion of button assembly input component 110b may be at least partially exposed to the external environment via an opening 109b through front wall 101f, and where at least a portion of audio speaker assembly output component 112b may be at least partially exposed to the external environment via an opening 109c through front wall 101f. It is to be understood that electronic device 100 may be provided with any suitable size or shape with any suitable number and type of components other than as shown in FIGS. 1A-1E, and that the embodiments of FIGS. 1A-1E are only exemplary. In other embodiments, as shown in FIG. 8, a force sensing assembly 814 may be at least partially combined with or incorporated into or positioned to work with a track pad input component 810 of a laptop computer electronic device 800, where force sensing assembly 814 may be configured to detect force inputs on an input surface of track pad input component 810. In yet other embodiments, as shown in FIG. 9 a force sensing assembly 914 may be at least partially combined with or incorporated into or positioned to work with an I/O interface 911 of a wearable computing electronic device 900 (e.g., a smart watch), where force sensing assembly 914 may be configured to detect force inputs on an input surface of I/O interface 911. It is to be understood that a force sensing assembly of any suitable electronic device may be configured to detect force inputs on any suitable input surface of any suitable component of the electronic device, including a housing surface rather than a conventional input component surface.

Figure 1A:
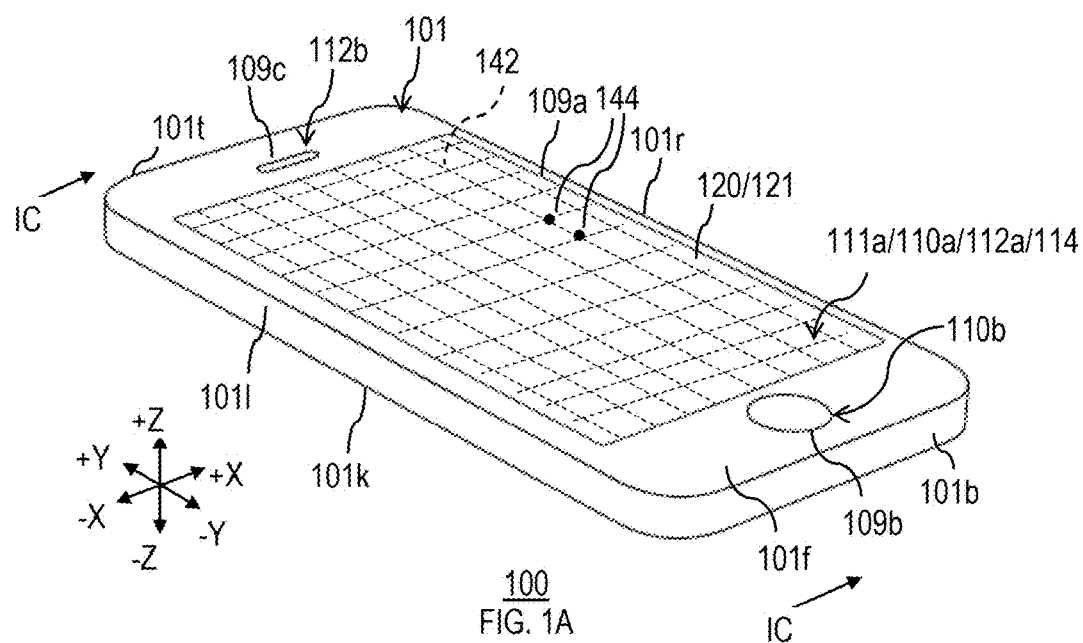
FIG. 1A is a front, left, bottom perspective view of the electronic device of FIG. 1, in accordance with some embodiments.
Figure 1B:
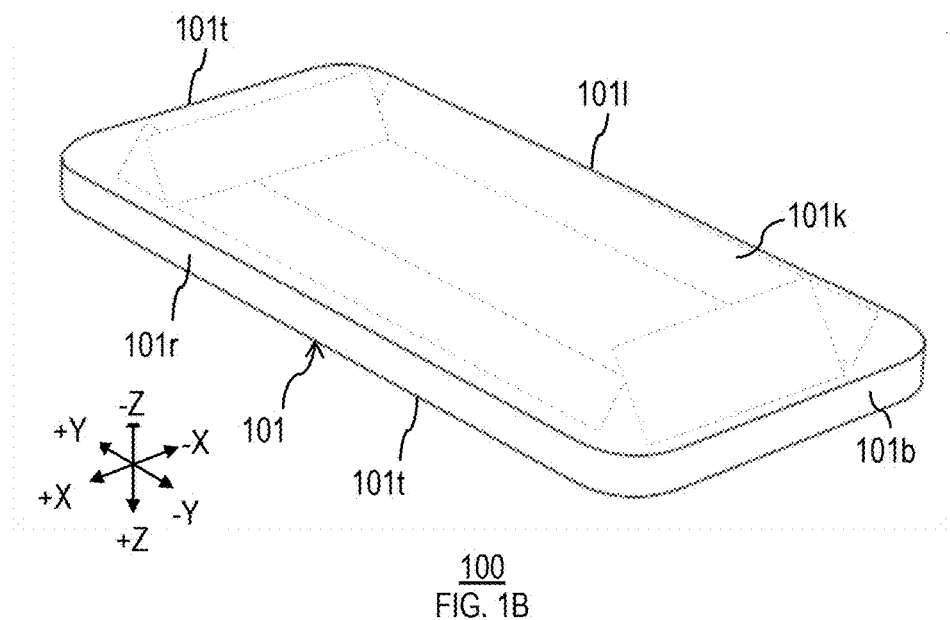
FIG. 1B is a back, right, bottom perspective view of the electronic device of FIGS. 1 and 1A, in accordance with some embodiments.
Figure 1C:
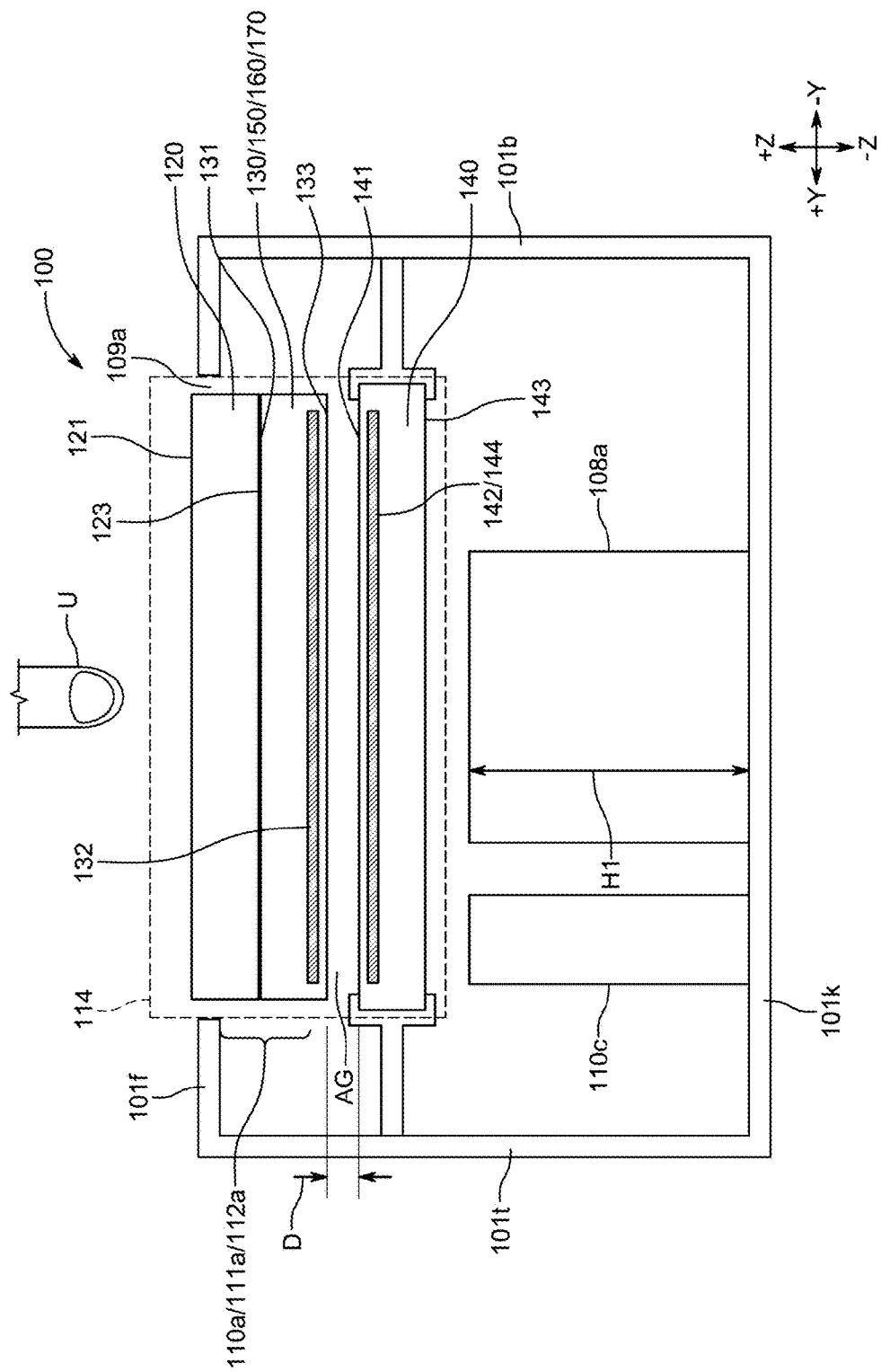
FIG. 1C is a cross-sectional view, taken from line IC-IC of FIG. 1A, of the electronic device of FIGS. 1-1B, when no user force is applied on the electronic device, in accordance with some embodiments.
Figure 1D:
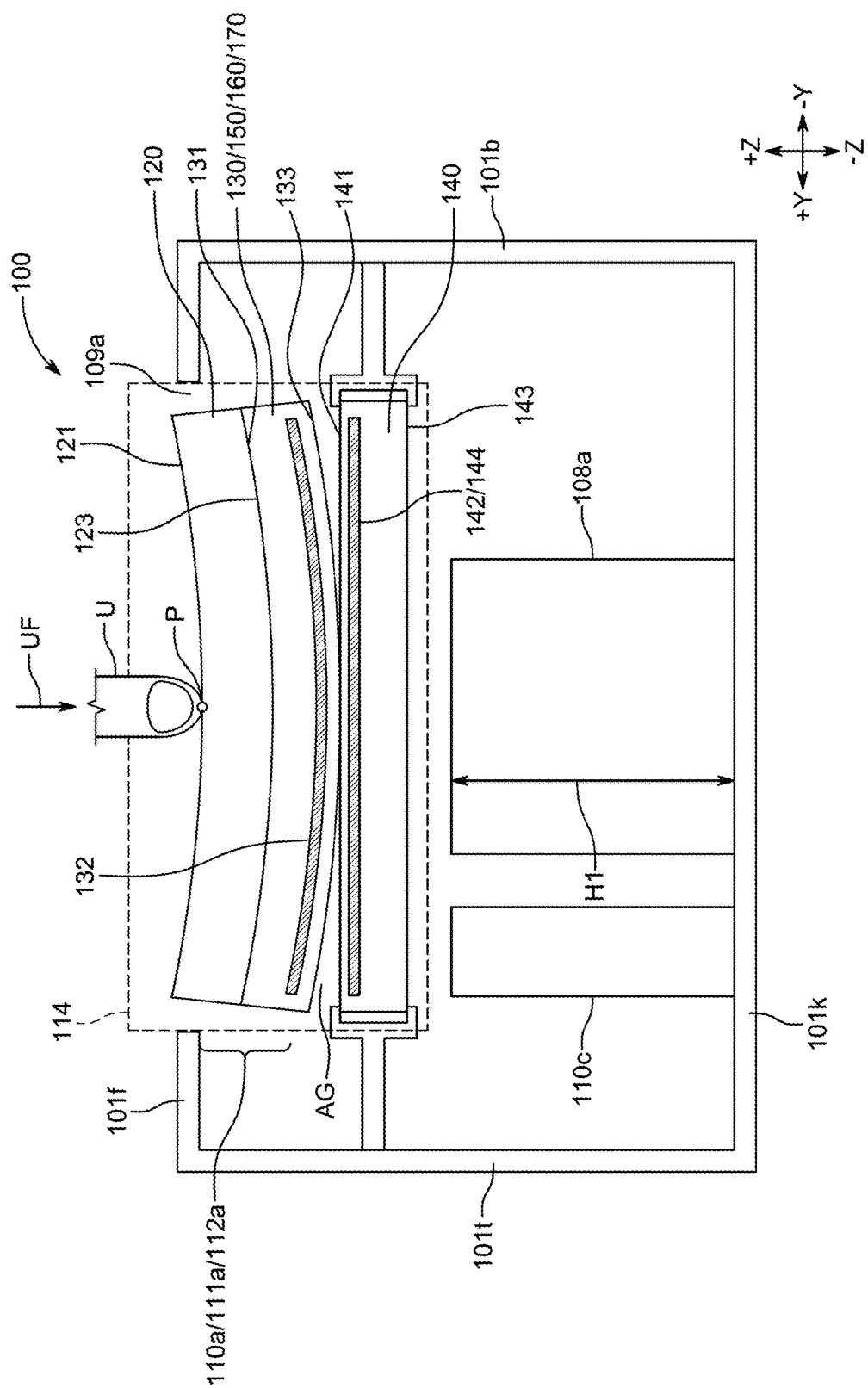
FIG. 1D is a cross-sectional view, similar to FIG. 1C, of the electronic device of FIGS. 1-1C, when a user force is applied on the electronic device, in accordance with some embodiments.
Figure 1E:
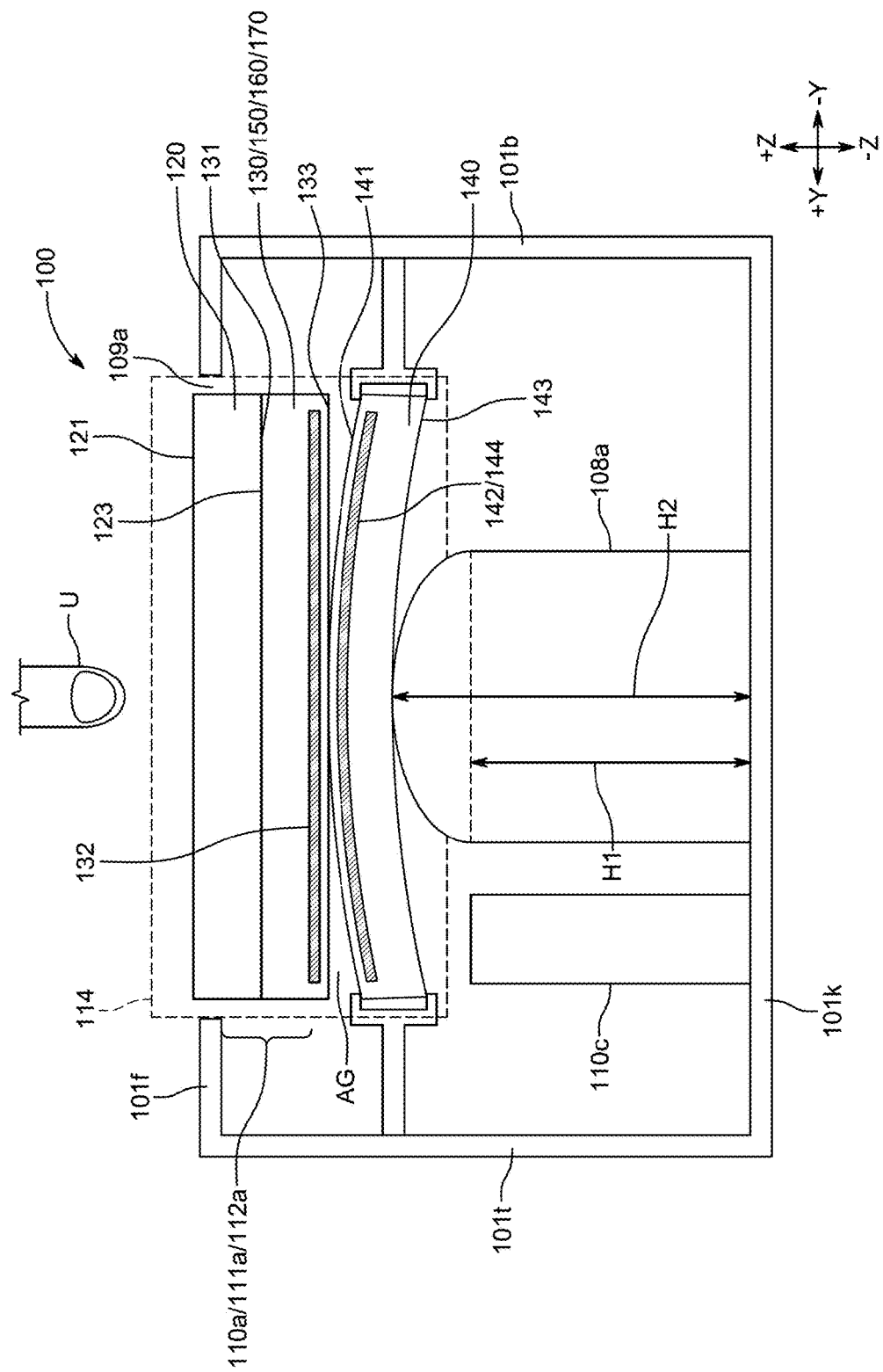
FIG. 1E is a cross-sectional view, similar to FIG. 1C, of the electronic device of FIGS. 1-1D, when no user force is applied on the electronic device but when the electronic device is experiencing an issue to be diagnosed, in accordance with some embodiments.

Continuing with the embodiment of FIGS. 1A-1E, as shown in FIGS. 1C-1E, for example, force sensing assembly 114 may include an input surface component 120, a first force sensing component 130, and a second force sensing component 140. Input surface component 120 may be any suitable component that may include an external surface 121 that may be exposed to the external environment of electronic device 100 via housing opening 109a, such that external surface 121 may be touched or otherwise affected by a user U or any other object or element of the external environment of electronic device 100 that may impart a force onto input surface component 120 of force sensing assembly 114 (e.g., a user force UF in the −Z direction at a point P along external surface 121 of FIG. 1D), such that force sensing assembly 114 may at least be configured to detect and measure the amount of force UF (e.g., force magnitude in gram-force ("gf")) applied by user U onto external surface 121. At least one other surface of input surface component 120, such as internal surface 123 that may be opposite external surface 121, may be coupled to or fixed to or integrated with first force sensing component 130, such as to an input surface 131 of first force sensing component 130. At least one other surface of first force sensing component 130, such as a sensing surface 133 that may be opposite input surface 131, may face a sensing surface 141 of second force sensing component 140. First force sensing component 130 may include a conductive electrical layer 132 (e.g., a capacitive sensor grid of a capacitive touch layer of a two-dimensional touch screen input component 110a) that may be provided along and/or adjacent to sensing surface 133 of first force sensing component 130, while second force sensing component 140 may include a sensor array 142 of any suitable number of sensors 144 (e.g., pressure detectors, strain gauges, electrodes, etc.) that may be provided along and/or adjacent to sensing surface 141 of second force sensing component 140. First force sensing component 130 and input surface component 120 may be made of any suitable materials and or may be held with respect to second sensing component 140 in any suitable manner that may enable first force sensing component 130 and input surface component 120 to at least partially deform or flex or bend or be moved towards or away from second sensing component when certain forces are applied thereto. For example, different magnitudes of force exerted on force sensing assembly 114 (e.g., different magnitudes of user force UF exerted on external surface 121 (e.g., in the −Z direction)) may alter the magnitude D of an air gap AG between sensing surface 133 and sensing surface 141 and, thus, may alter the distance between conductive electrical layer 132 of first force sensing component 130 and sensor array 142 of second force sensing component 140 (e.g., the distance between at least a portion of conductive electrical layer 132 and at least a portion of sensor array 142 may change (e.g., decrease) between the instance of FIG. 1C when user U is not applying any force onto force sensing assembly 114 and the instance of FIG. 1D when user U is applying user force UF at point P along external surface 121 of force sensing assembly 114, whether or not sensing surface 133 and sensing surface 141 actually contact each other during the instance when user force UF is applied). Such a change in the distance between conductive electrical layer 132 of first force sensing component 130 and sensor array 142 of second force sensing component 140, or between any two suitable capacitive plates or surfaces or piezoelectric materials or the like of force sensing assembly 114, may result in a change of capacitance or other suitable electrical characteristic that may be detected and measured by electronic device 100 (e.g., by any suitable circuitry of force sensing assembly 114 (e.g., by each sensor 144 of sensor array 142) and/or any suitable force sensing application 103 that may be run by processor 102 (e.g., to determine how close a capacitive sensor of layer 132 has been pushed towards a strain gauge of array 142)). First sensing component 130 may be fixed with respect to input surface component 120 that together may be operative to flex or deform when a force is applied thereto for changing magnitude D of air gap AG with respect to second sensing component 140, while second sensing component 140 may be at least partially retained by a portion of housing 101 or otherwise for allowing magnitude D to change.

In some embodiments, input surface component 120 may be a cover glass (e.g., an alkali-aluminosilicate sheet toughened glass, sapphire glass, etc.) or any other suitable material structure that may provide external surface 121 suitable for interfacing with the external environment and/or suitable for receiving light thereon and/or transmitting light therethrough for detection by user U or any other object of the external environment (e.g., light from display assembly output component 112a of I/O interface 111a), where the material structure may include any suitable coating thereon (e.g., an oleophobic coating that may reduce the accumulation of fingerprints on external surface 121). Although, as shown in FIGS. 1C-1E, external surface 121 of input surface component 120 may form an exterior surface (or a surface in communication with an exterior surface) of I/O interface 111a (e.g., a touch screen), such an input surface component of a force sensing assembly may provide an exterior surface of a track pad (see, e.g., FIG. 8) or of an I/O interface of a wearable device of (see, e.g., FIG. 9) or of a housing of any suitable device. In some embodiments, when input surface component 120 of force sensing assembly 114 is used by a touch screen I/O interface 111a, input surface component 120 may be at least partially translucent for communicating light from display assembly component 112a to user U. In such embodiments, first force sensing component 130 may also be configured to provide any suitable portion I/O interface 111a. For example, first force sensing component 130 may provide at least a portion of any suitable light-emitting subassembly 150 of display assembly output component 112a that may be operative to generate and emit light that may be used to selectively illuminate at least a portion of external surface 121 for viewing by user U (e.g., one or more light-generating and/or light-emitting elements (e.g., one or more light emitting diodes, etc.) and/or one or more back light units and/or light guide pipes for evenly distributing light). Additionally or alternatively, first force sensing component 130 may provide at least a portion of any suitable display selection subassembly 160 of display assembly output component 112a that may be operative to selectively address individual pixels of the display (e.g., an active matrix that may be electrically controlled (e.g., on a pixel by pixel basis) to selectively transmit therethrough and towards a particular portion of external surface 121 any light emitted from light-emitting subassembly 150). Additionally or alternatively, first force sensing component 130 may provide at least a portion of any suitable touch sensing subassembly 170 of touch assembly input component 110a that may be operative to detect the position of one or more touch events or near touch events (e.g., by user U or any other suitable object in the external environment of device 100 (e.g., at point P)) along external surface 121 (e.g., in a two-dimensional plane (e.g., in an X-Y plane along surface 121)), such as a resistive touch screen, a surface acoustic wave touch screen, a capacitive sensing touch screen, an infrared touch screen, an acoustic pulse recognition touch screen, and/or the like (e.g., for detecting touch location and movement in two-dimensions (e.g., in an X-Y plane), while force sensing assembly 114 may detect touch or other force movement in a third-dimension (e.g., along the Z-axis), thereby combining to enable device 100 to provide "3D-touch" control). Any suitable element(s) of one or more of such a light-emitting subassembly 150 and/or of such a display selection subassembly 160 and/or of such a touch sensing subassembly 170 of I/O interface 111a may be operative to provide at least a portion of conductive electrical layer 132 of force sensing assembly 114 (e.g., a capacitive sensor grid of a capacitive touch layer and/or intersecting rows and columns of electrical conductors of a two-dimensional touch screen of touch sensing subassembly 170). In other embodiments, one, some, or each one of light-emitting subassembly 150 and/or of such a display selection subassembly 160 and/or of such a touch sensing subassembly 170 of I/O interface 111a may be at least partially distinct from force sensing assembly 114.

Force sensing assembly 114 may be partitioned into a two-dimensional map of force sensor pixels, where each force sensor pixel may correspond to a portion of surface 121 under which a particular sensor 144 of array 122 of force sensing assembly 114 may be positioned (e.g., an 8×12 array of sensors 144 (e.g., in an X-Y plane), as shown in broken-line in FIG. 1A), and each sensor 144 may be operative to create signals corresponding to force sensing measurement ("FSM") data for its corresponding force sensor pixel. These signals may typically each include a magnitude related to the strength of force sensed at the force sensor pixel and information correlating the magnitude to the corresponding force sensor pixel so that the signals can be understood in a map form. Any suitable processing device (e.g., processor 102 or a processing device of server 50) may be operative to receive and process those individual signals for any suitable purpose (e.g., to estimate an unknown applied force, to calibrate force sensing assembly 114, to diagnose device 100, to provide a visualization of FSM data, etc.).

A force sensing measurement FSM (e.g., a magnitude of capacitance or other electrical characteristic or a gap magnitude (e.g., distance (e.g., shortest distance) between sensor 144 and electrical layer 132)) may be detected and measured by one, some, or each sensor 144 of sensor array 142 (e.g., due to electrical layer 132) at any suitable moment and may be used to detect any force applied to force sensing assembly 114 (e.g., change in gap magnitude may be determined based on detected capacitance change that may then be used to determine force). As a specific example, sensor array 142 may include an array of 96 sensors 144 (e.g., in an 8×12 array (e.g., in an X-Y plane) spanning along second force sensing component 140 (e.g., underneath a majority of external surface 121 (see, e.g., FIG. 1A))), and device 100 may be operative to detect and store an FSM from each one of sensors 144 at each one of a number of various calibration instances for calibrating force sensing assembly 114. Such calibration instances may include, but are not limited to, a calibration instance when no known external force is applied to force sensing assembly 114 (e.g., by user U) while force sensing assembly 114 is at a first orientation (e.g., while device 100 with force sensing assembly 114 is resting front-up on a flat surface in an X-Y plane (e.g., an orientation of FIG. 1A with back surface 101k of device 100 resting on a flat surface relative to gravity)), a calibration instance when no known external force is applied to force sensing assembly 114 (e.g., by user U) while force sensing assembly 114 is at a second orientation (e.g., while device 100 with force sensing assembly 114 is resting front-down on a flat surface in an X-Y plane (e.g., an orientation of FIG. 1B with front surface 101f of device 100 resting on a flat surface relative to gravity)), a calibration instance when only a first known external calibration force (e.g., a force of 100 gF)) is applied to force sensing assembly 114 (e.g., by a robotic probe mimicking human touch) at only a first one of Q calibration positions along external surface 121 while force sensing assembly 114 is at a particular calibration orientation, a calibration instance when only the first known external calibration force (e.g., a force of 100 gF) is applied to force sensing assembly 114 at only a second one of Q calibration positions along external surface 121 while force sensing assembly 114 is at the particular calibration orientation, and so on with the first known external calibration force at each one of Q calibration positions along external surface 121 (e.g., 45 calibration positions in a 5×9 array (e.g., in an X-Y plane) spanning along the majority of external surface 121 and array 142 of sensors 144) while force sensing assembly 114 is at the particular calibration orientation, a calibration instance when only a second known external calibration force (e.g., a force of 400 gF) is applied to force sensing assembly 114 at only the first one of Q calibration positions along external surface 121 while force sensing assembly 114 is at the particular calibration orientation, a calibration instance when only the second known external calibration force (e.g., a force of 400 gF) is applied to force sensing assembly 114 at only the second one of Q calibration positions along external surface 121 while force sensing assembly 114 is at the particular calibration orientation, and so on with the second known external calibration force at each one of the Q calibration positions along external surface 121 (e.g., 45 calibration positions in a 5×9 array (e.g., in an X-Y plane) spanning along the majority of external surface 121) while device 100 is at the particular calibration orientation. Therefore, when there are 45 calibration positions and 96 sensors 144 and 2 known external calibration forces used, there may be 8,640 FSMs (i.e., 45*96*2) detected for the 90 calibration instances for the 2 known applied forces at 45 calibration positions plus an additional 192 FSMs (i.e., 96*2) detected for the 1 calibration instance at each one of two orientations with no known applied force, thereby resulting in a total of 8,832 FSMs detected over 92 calibration instances during such a calibration process. The data from these calibration FSMs may then be used to calibrate force sensing assembly 114 by constructing a system model to approximate a transfer function of the force sensing assembly 114. It is to be understood that the numbers of the above example are just exemplary and that any suitable number of sensors 144 may be provided by array 142 and any suitable number Q of calibration positions and/or total calibration instances and FSM data readings may be used during an initial calibration process.

A calibration process for force sensing assembly 114 may be performed at a factory in which electronic device 100 and/or force sensing assembly 114 is manufactured, assembled, and/or packaged, or any other suitable location. In some embodiments, the calibration that is performed may be device specific, where each device may be calibrated using the process although different coefficients for the transfer function and its inverse may be determined. However, it is also contemplated that the calibration process may be used at other times so long as a reference model may be determined for calibration purposes. The calibration process may begin when the FSMs are detected for each calibration instance, such as the 8,832 FSMs for the 92 calibration instances mentioned, where such calibration FSM data and associated calibration instance data describing the calibration instances during which such calibration FSM data was obtained (e.g., known device orientations (e.g., orientations that may be determined using orientation data from one or more orientation sensors (e.g., one or more motion sensors) of auxiliary sensor assembly 116 and/or controlled by trusted calibration tools), known forces (e.g., forces with magnitudes that may be controlled by trusted calibration tools), known calibration positions (e.g., positions of force application that may be determined by touch sensing subassembly 170 and/or controlled by trusted calibration tools), etc.) may be stored as calibration data 105a (e.g., on memory 104 of device 100 and/or on any suitable calibration server (e.g., server 50)). Then, a system model may be determined that may approximate a transfer function associated with force sensing assembly 114 using calibration data 105a (e.g., the FSMs and the known characteristics of the calibration instances). Once the transfer function is approximated, and once coefficients of the transfer function are determined, a model of the transfer function may be determined. In some implementations, the model may be a second-order system model of the force sensing assembly. Next, the coefficients of the model may be stored as model data 105b (e.g., on memory 104 of device 100 and/or on any suitable calibration server (e.g., server 50)). Then, an inverse of the transfer function may be determined. The inverse transfer function may then be stored as inverse transfer function data 105c (e.g., on memory 104 of device 100), where the inverse transfer function may then be used with any FSMs later detected by force sensing assembly 114 to estimate or predict the magnitude(s) of the force(s) being applied to force sensing assembly 114. For example, a process for estimating applied force by force sensing assembly 114 using the inverse transfer function determined during calibration may be used when any unknown force input is being provided on force sensing assembly 114 (e.g., in the field during use by an end user of device 100 or while still in a factory or otherwise). This estimation process may be able to distinguish between a first amount of force that may be associated (e.g., by an application 103) with a first command and a second amount of force that may be associated (e.g., by an application 103) with a second, different command. The estimation process may include receiving one or a number of FSMs at some estimation instance (e.g., 96 FSMs (e.g., 1 FSM from each one of the 96 sensors 144 of sensor array 142)) when an unknown force is applied to force sensing assembly 114 and the inverse transfer function (e.g., inverse transfer function data 105c) may be applied to such FSM data to provide an output that estimates the applied force, and then such an estimated applied force (e.g., position(s) and magnitude(s) of the estimated applied force(s)) may then be provided to any suitable application 103 of processor 102 of electronic device 100 that may be used to instruct device 100 to function in a specific manner based on the estimated applied force(s). Therefore, known force or known lack of force may be applied across external surface 121, including at locations near or on a boundary of the force-sensing area of external surface 121. The FSM data output of force sensing assembly (e.g., of sensors 144 of sensor array 142) may be read out and generated as a strain map (e.g., by processor 102 or server 50 using any suitable application) for each calibration instance. Such a strain map may be used to calculate calibration constants for the different locations at which known force was (and was not) applied, because, as the applied forces are known, they may be correlated to the output strain map and the various constants required to scale the force to the output may be determined. Calibration constants may vary across the force-sensing area of external surface 121 or may be relatively constant. The calibration constants may relate sensor signal to force or strain to force, and may be stored in memory 104 of device 100, such that these constants may later be retrieved and used to estimate a force applied to force sensing assembly 114. Certain embodiments may employ element deformation-based algorithms to correlate a deflection map of the force-sensing surface to one or more force inputs.

At least some of calibration data 105a, model data 105b, and/or transfer function data 105c may be updated after the initial calibration of force sensing assembly 114, such as when device 100 with force sensing assembly 114 is being used in the field in a particular manner by an end user or at any other suitable location and/or moment. For example, device 100 may be configured to detect a first device calibration condition FSM data set representative of FSM data from one, some, or each sensor 144 of sensor array 142 when device 100 is able to determine that the same conditions currently exist as existed during the first calibration instance described above (e.g., when device 100 is able to determine (e.g., using touch position data from touch sensing subassembly 170) that no external force is currently being applied to surface 121 of force sensing assembly 114 and to determine (e.g., using orientation data from one or more orientation sensors of auxiliary sensor assembly 116) that force sensing assembly 114 of device 100 is currently in a first device orientation (e.g., an orientation in which device 100 with force sensing assembly 114 is resting front-up on a flat surface in an X-Y plane (e.g., an orientation of FIG. 1A with back surface 101k of device 100 resting on a flat surface perpendicular to gravity (e.g., external surface 121 at a 0° orientation to the flat surface)))), which may be referred to herein as a "0°/no external" device calibration condition or a first device calibration condition, and then device 100 may be configured to use such newly detected FSM data to replace the portion of earlier detected FSM data of calibration data 105a that was previously detected at that same first device calibration condition. Additionally or alternatively, device 100 may be configured to detect a second device calibration condition FSM data set representative of FSM data from one, some, or each sensor 144 of sensor array 142 when device 100 is able to determine that the same conditions currently exist as existed during the second calibration instance described above (e.g., when device 100 is able to determine (e.g., using touch position data from touch sensing subassembly 170) that no external force is currently being applied to surface 121 of force sensing assembly 114 and to determine (e.g., using orientation data from one or more orientation sensors of auxiliary sensor assembly 116) that force sensing assembly 114 of device 100 is currently in a second device orientation (e.g., an orientation in which device 100 with force sensing assembly 114 is resting front-down on a flat surface in an X-Y plane (e.g., an orientation of FIG. 1B with front surface 101f of device 100 resting on a flat surface perpendicular to gravity (e.g., external surface 121 at a 180° orientation to the flat surface)))), which may be referred to herein as a "180°/no external" device calibration condition or a second device calibration condition, and then device 100 may be configured to use such newly detected FSM data to replace the portion of earlier detected FSM data of calibration data 105a that was previously detected at that same second device calibration condition. Then, device 100 may update model data 105b and/or transfer function data 105c using such updated calibration data 105a (e.g., using any suitable application 103). This may allow at least a portion of calibration data 105a and/or model data 105b and/or transfer function data 105c to be updated to reflect any factors that may have changed with respect to force sensing assembly 114 and/or device 100 since the initial calibration.

Detection of new FSM data for updating calibration data 105a may occur in response to device 100 determining the existence of any suitable appropriate device calibration conditions in any suitable manner. For example, device 100 may be operative to actively instruct a user of device 100 (e.g., via a user interface of device 100) to orient device 100 in a particular orientation and to apply no external forces on surface 121 in order for device 100 to achieve a particular device calibration condition (e.g., to replicate a particular device calibration condition or calibration instance that may be defined by particular calibration instance data of calibration data 105a), where such orientation and lack of external forces may then be confirmed by device 100 (e.g., using orientation data from one or more orientation sensors of auxiliary sensor assembly 116 and/or using touch position data from touch sensing subassembly 170) before detecting a new device calibration condition FSM data set for use in adding to, updating, or replacing certain device calibration condition FSM data of calibration data 105a. Alternatively, device 100 may be operative to detect when current conditions of device 100 match conditions of a particular device calibration condition or calibration instance (e.g., as may be defined by calibration instance data of calibration data 105a) and may then be configured to automatically detect new a device calibration condition FSM data set for use in adding to, updating, or replacing certain device calibration condition FSM data of calibration data 105a (e.g., without ever instructing a user of device 100 to actively do anything or without the user even knowing such updating is occurring). Device 100 may be configured to do such updating on a periodic basis (e.g., every 90 days) or upon request by a user or upon any other suitable event.

Certain calibration data of device 100 may be compared with certain calibration data of a "golden" unit or "golden" device of the same type as device 100 in order to diagnose device 100, where such a "golden" device may be an ideal example of the device type of device 100 (e.g., the particular smart phone make and model of device 100 of FIGS. 1A-1E with the same force sensing assembly) that has been validated to have been built with no mechanical or other defects and that performs exactly as it is intended. For example, any suitable calibration FSM data detected from force sensing assembly 114 of device 100 under certain conditions of a particular calibration instance defined by calibration instance data of calibration data 105a, whether detected in a factory during initial calibration of device 100 or in the field when device 100 is under the control of an end user, may also be referred to herein as device diagnostic data 107a and may be stored on memory 104 of device 100 and/or on server 50 for comparison with golden diagnostic data 107b from a force sensing assembly of a golden unit. In some embodiments, device diagnostic data 107a may include at least a first device diagnostic condition FSM data set representative of FSM data from one, some, or each sensor 144 of sensor array 142 when it is determined that force sensing assembly 114 of device 100 is in a first device condition (e.g., no external force applied onto surface 121 while force sensing assembly 114 is in a first device orientation (e.g., an orientation in which device 100 with force sensing assembly 114 is resting front-up on a flat surface in an X-Y plane (e.g., an orientation of FIG. 1A with back surface 101k of device 100 resting on a flat surface perpendicular to gravity (e.g., external surface 121 at a 0° orientation to the flat surface)))), which may be referred to herein as a "0°/no external" device diagnostic condition or a first device diagnostic condition, which may be the same as the first device calibration condition described herein, such that the first device diagnostic condition FSM data set of device diagnostic data 107a may be the same as the first device calibration condition FSM data set of device calibration data 105a for electronic device 100. Additionally or alternatively, in some embodiments, device diagnostic data 107a may include a second device diagnostic condition FSM data set representative of FSM data from one, some, or each sensor 144 of sensor array 142 when it is determined that force sensing assembly 114 of device 100 is in a second device condition (e.g., no external force applied onto surface 121 while force sensing assembly 114 is in a second device orientation (e.g., an orientation in which device 100 with force sensing assembly 114 is resting front-down on a flat surface in an X-Y plane (e.g., an orientation of FIG. 1B with front surface 101f of device 100 resting on a flat surface perpendicular to gravity (e.g., external surface 121 at a 180° orientation to the flat surface)))), which may be referred to herein as a "180°/no external" device diagnostic condition or a second device diagnostic condition, which may be the same as the second device calibration condition described herein, such that the second device diagnostic condition FSM data set of device diagnostic data 107a may be the same as the second device calibration condition FSM data set of device calibration data 105a for electronic device 100. Alternatively, the first device diagnostic condition may be different than the first device calibration condition (e.g., they may involve different device orientations with respect to a flat surface perpendicular to gravity) and/or the second device diagnostic condition may be different than the second device calibration condition (e.g., they may involve different device orientations with respect to a flat surface perpendicular to gravity). Additionally or alternatively, in such embodiments, device diagnostic data 107a may include device diagnostic condition data that may be indicative of the device diagnostic conditions under which each one of the one or more device diagnostic condition FSM data sets was detected. Additionally or alternatively, in such embodiments, device diagnostic data 107a may include a delta device diagnostic condition FSM data set that may be representative of the difference between the FSM data of the first device diagnostic condition FSM data set and the FSM data of the second device diagnostic condition FSM data set (if any).

Similarly, golden diagnostic data 107b may be stored on memory 104 of device 100 and/or on server 50. Such golden diagnostic data 107b may include at least a first golden diagnostic condition FSM data set representative of FSM data from one, some, or each sensor of a sensor array of a force sensing assembly of a golden unit when that golden unit is in any first golden diagnostic condition (e.g., no external force applied onto the external surface of the force sensing assembly while the force sensing assembly is in a first golden diagnostic orientation), if not also a second golden diagnostic condition FSM data set representative of FSM data from one, some, or each sensor of a sensor array of a force sensing assembly of a golden unit when that golden unit is in any second golden diagnostic condition (e.g., no external force applied onto the external surface of the force sensing assembly while the force sensing assembly is in a second golden diagnostic orientation). Additionally or alternatively, in such embodiments, golden diagnostic data 107b may include golden diagnostic condition data that may be indicative of the golden diagnostic conditions under which each one of the one or more golden diagnostic condition FSM data sets was detected. Additionally or alternatively, in such embodiments, golden diagnostic data 107b may include a delta golden diagnostic condition FSM data set that may be representative of the difference between the FSM data of the first golden diagnostic condition FSM data set and the FSM data of the second golden diagnostic condition FSM data set (if any). In some embodiments, the first golden diagnostic condition (e.g., orientation and external applied force) of the first golden diagnostic condition may be the same as the device condition of the first device diagnostic condition (e.g., the external surface of the force sensing assembly may be at the same orientation to a flat surface perpendicular to gravity (e.g., 0°) with no external force applied by a user), while in other embodiments, the first golden diagnostic condition of the first golden diagnostic condition may be different than the device condition of the first device diagnostic condition (e.g., although no external force may be applied during either condition, the first golden diagnostic condition may include the external surface of the force sensing assembly being at a 45° orientation to a flat surface perpendicular to gravity while the first device diagnostic condition may include the external surface of the force sensing assembly being at a 0° orientation to a flat surface perpendicular to gravity). Similarly, in some embodiments, the second golden diagnostic condition of any second golden diagnostic condition (e.g., orientation and external applied force) may be the same as the device condition of any second device diagnostic condition (e.g., the external surface of the force sensing assembly may be at the same orientation to a flat surface perpendicular to gravity (e.g., 180°) with no external force applied by a user), while in other embodiments, the second golden diagnostic condition of any second golden diagnostic condition may be different than the device condition of any second device diagnostic condition (e.g., although no external force may be applied during either condition, the second golden diagnostic condition may include the external surface of the force sensing assembly being at a 135° orientation to a flat surface perpendicular to gravity while the second device diagnostic condition may include the external surface of the force sensing assembly being at a 180° orientation to a flat surface perpendicular to gravity).

Figure 3:
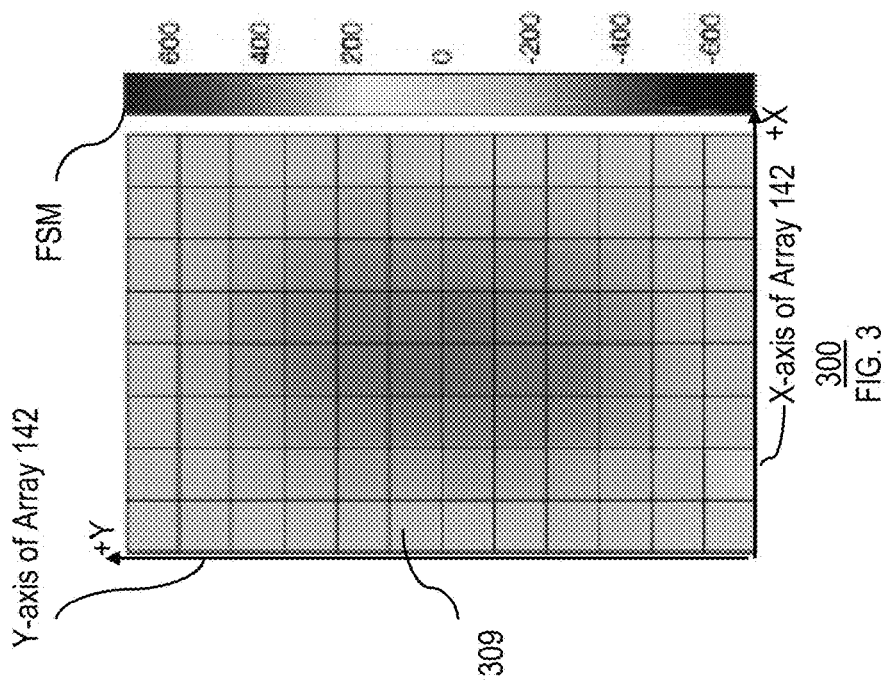
Figure 2:
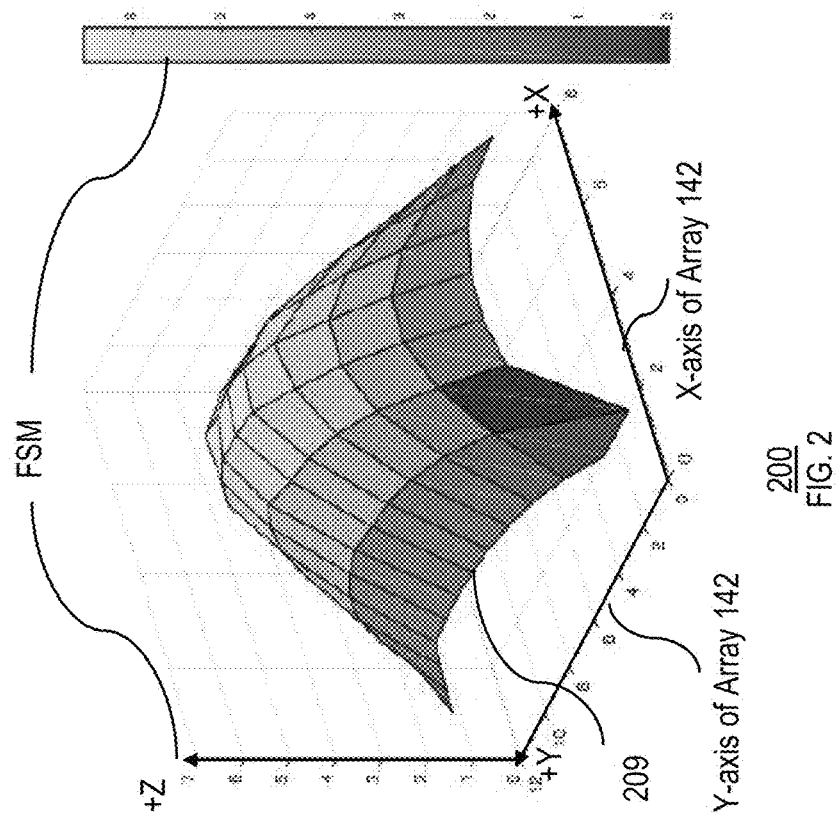
FIG. 2 is a three-dimensional map of illustrative data defined by force sensing measurements, in accordance with some embodiments.

Any golden diagnostic condition FSM data set of golden diagnostic data 107b and/or any device diagnostic condition FSM data set of device diagnostic data 107a may be represented in any suitable type of data structure or described in any suitable construct, such as a matrix, a two-dimensional map, and/or a three-dimensional map. For example, any one of a first golden diagnostic condition FSM data set, a second golden diagnostic condition FSM data set, and a delta golden diagnostic condition FSM data set of golden diagnostic data 107b may be referred to herein as a golden diagnostic data matrix [Mg], and any one of a first device diagnostic condition FSM data set, a second device diagnostic condition FSM data set, and a delta device diagnostic condition FSM data set of device diagnostic data 107a may be referred to herein as a device diagnostic data matrix [Md]. Each diagnostic data matrix may be a matrix with m rows and n columns of entries of FSM data, where m may be equal to the number of rows of sensors 144 in array 142 of force sensing assembly 114 of the device that generated the FSM data set of that matrix (e.g., device 100 or the golden unit) and where n may be equal to the number of columns of sensors 144 in array 142 of force sensing assembly 114 of the device that generated the FSM data set of that matrix (e.g., device 100 or the golden unit). For example, continuing with the example of FIGS. 1A-1E, array 142 of force sensing assembly 114 of device 100 may include 12 rows of sensors 144 and 8 columns of sensors 144, such that each diagnostic data matrix of device 100 and its associated golden unit may be a matrix with m=12 rows and n=8 columns of entries of FSM data. Additionally or alternatively, any suitable processing device (e.g., processor 102 or a processing device of server 50) may be operative to receive and process any suitable diagnostic condition FSM data set of device diagnostic data 107a and/or of golden diagnostic data 107b and/or any other suitable data matrix to provide any suitable visualization of such FSM data (e.g., via any suitable display output component assembly of device 100 (e.g., display assembly output component 112a) or of server 50) to any suitable entity (e.g., an end user of device 100 and/or a worker at a device rehabilitation center (e.g., a tech support "Genius" at a retail store of Apple Inc. (e.g., at a "Genius Bar")), etc.). For example, as shown in FIG. 2, a three-dimensional map 200 may be generated by any suitable processing device to illustrate any suitable diagnostic condition FSM data set 209 that may be similar to any suitable data set of diagnostic data 107 (e.g., of device diagnostic data 107a and/or golden diagnostic data 107b), where the X-axis of three-dimensional map 200 may be indicative of each X-axis column of sensors of the sensor array of the force sensing assembly (e.g., each one of 8 X-axis columns of sensors 144 of array 142), where the Y-axis of three-dimensional map 200 may be indicative of each Y-axis row of sensors of the sensor array of the force sensing assembly (e.g., each one of 12 Y-axis rows of sensors 144 of array 142), and where the Z-axis of the three-dimensional map 200 may be indicative of the magnitude of the FSM data of the diagnostic condition FSM data set 209 of map 200. Additionally or alternatively, as shown in FIG. 3, a two-dimensional map 300 may be generated by any suitable processing device to illustrate any suitable diagnostic condition FSM data set 309 that may be similar to any suitable data set of diagnostic data 107 (e.g., of device diagnostic data 107a and/or golden diagnostic data 107b), where the X-axis of two-dimensional map 300 may be indicative of each X-axis column of sensors of the sensor array of the force sensing assembly (e.g., each X-axis column of sensors 144 of array 142 of device 100 or the same of the golden unit), where the Y-axis of two-dimensional map 300 may be indicative of each Y-axis row of sensors of the sensor array of the force sensing assembly (e.g., each Y-axis row of sensors 144 of array 142 of device 100 or the same of the golden unit), and where different shadings or other suitable indicators of two-dimensional map 300 may be indicative of the different magnitudes of the FSM data of the diagnostic condition FSM data set 309 of map 300, and also where a key or legend may also be provided for correlating each indicator to a magnitude. It is to be understood, however, that any suitable diagnostic condition FSM data set of device diagnostic data 107a and/or any suitable diagnostic condition FSM data set of golden diagnostic data 107b may be represented in any suitable other type of data structure or described in any other suitable construct.

While any one of a first device diagnostic condition FSM data set, a second device diagnostic condition FSM data set, and a delta device diagnostic condition FSM data set of device diagnostic data 107a may be referred to herein as a device diagnostic data matrix [Md], such a first device diagnostic condition FSM data set may also be referred to herein as a first device diagnostic condition data matrix [Md-c1], such a second device diagnostic condition FSM data set may also be referred to herein as a second device diagnostic condition data matrix [Md-c2], and such a delta device diagnostic condition FSM data set may also be referred to herein as a delta device diagnostic condition data matrix [Md-Δ]. In some embodiments, a delta device data set between a first device diagnostic condition FSM data set and a second device diagnostic condition FSM data set of DUT device 100 may be calculated using any suitable mathematical formulas. As just one example, in order to calculate a delta device diagnostic condition data matrix [Md-Δ] between a first device diagnostic condition data matrix [Md-c1] and a second device diagnostic condition data matrix [Md-c2] of device diagnostic data 107a, the following equation (1a) may be used:

$$[Md\text{-}\Delta]=[Md\text{-}c1]-[Md\text{-}c2]. \tag{1a}$$

Alternatively, as just one other example, in order to calculate a delta device diagnostic condition data matrix [Md-Δ] between a first device diagnostic condition data matrix [Md-c1] and a second device diagnostic condition data matrix [Md-c2] of device diagnostic data 107*a*, the following equation (1b) may be used:

$$[Md\text{-}\Delta]=[Md\text{-}c1]-([Md\text{-}c2]^T[Md\text{-}c2])^{-1}[Md\text{-}c2]^T[Md\text{-}c1][Md\text{-}c2], \quad (2a)$$

where equation (2a), unlike equation (1a), may be operative to minimize or remove any difference between the amplitude of first device diagnostic condition data matrix [Md-c1] and the amplitude of second device diagnostic condition data matrix [Md-c2] (e.g., to achieve spatial amplitude matching between the first device diagnostic condition FSM data set of first device diagnostic condition data matrix [Md-c1] and the second device diagnostic condition FSM data set of second device diagnostic condition data matrix [Md-c2] for calculating the delta device diagnostic condition data matrix [Md-Δ] for DUT device 100). This may remove any baseline gap information (e.g., usually on the order of 500 um), which may be more like an offset, and may extract only the DUT device's force sensor assembly's movement due to inertial effect (e.g., usually on the order of 10 um), such that "shape" information may remain, which may be the ratio of each sensor's value relative to the largest sensor value in the matrix array, such that the data from any first device diagnostic orientation of a first device diagnostic condition and from any second device diagnostic orientation of a second device diagnostic condition may be normalized, whereas the larger the difference between the two device diagnostic orientations (e.g., the closer to a 180° difference between the two device diagnostic orientations) may provide lesser noisy data. In some embodiments, if delta device diagnostic condition data matrix [Md-Δ] for DUT device 100 is calculated to be zero for each value of each entry in the array (e.g., if the data set is null), then it may be concluded that the force sensing assembly of DUT device 100 is dead or otherwise broken (e.g., a diagnosis may be made that the hardware of the force sensing assembly is faulty) and the diagnosis of DUT device 100 may stop here without proceeding to any of the following subprocesses described hereinbelow.

Similarly, while any one of a first golden diagnostic condition FSM data set, a second golden diagnostic condition FSM data set, and a delta golden diagnostic condition FSM data set of golden diagnostic data 107*b* may be referred to herein as a golden diagnostic data matrix [Mg], such a first golden diagnostic condition FSM data set may also be referred to herein as a first golden diagnostic condition data matrix [Mg-c1], such a second golden diagnostic condition FSM data set may also be referred to herein as a second golden diagnostic condition data matrix [Mg-c2], and such a delta golden diagnostic condition FSM data set may also be referred to herein as a delta golden diagnostic condition data matrix [Mg-Δ]. In some embodiments, a delta golden data set between a first golden diagnostic condition FSM data set and a second golden diagnostic condition FSM data set of a golden unit may be calculated using any suitable mathematical formulas. As just one example, in order to calculate a delta golden diagnostic condition data matrix [Mg-Δ] between a first golden diagnostic condition data matrix [Mg-c1] and a second golden diagnostic condition data matrix [Mg-c2] of golden diagnostic data 107*b*, the following equation (1b) may be used:

$$[Mg\text{-}\Delta]=[Mg\text{-}c1]-[Mg\text{-}c2]. \quad (1b)$$

Alternatively, as just one other example, in order to calculate a delta golden diagnostic condition data matrix [Mg-Δ] between a first golden diagnostic condition data matrix [Mg-c1] and a second golden diagnostic condition data matrix [Mg-c2] of golden diagnostic data 107*b*, the following equation (2b) may be used:

$$[Mg\text{-}\Delta]=[Mg\text{-}c1]-([Mg\text{-}c2]^T[Mg\text{-}c2])^{-1}[Mg\text{-}c2]^T[Mg\text{-}c1][Mg\text{-}c2], \quad (2b)$$

where equation (2b), unlike equation (1b), may be operative to minimize or remove any difference between the amplitude of first golden diagnostic condition data matrix [Mg-c1] and the amplitude of second golden diagnostic condition data matrix [Mg-c2] (e.g., to achieve spatial amplitude matching between the first golden diagnostic condition FSM data set of first golden diagnostic condition data matrix [Mg-c1] and the second golden diagnostic condition FSM data set of second golden diagnostic condition data matrix [Mg-c2] for calculating the delta golden diagnostic condition data matrix [Mg-Δ] for the golden unit). This may remove any baseline gap information (e.g., usually on the order of 500 um), which may be more like an offset, and may extract only the golden unit's force sensor assembly's movement due to inertial effect (e.g., usually on the order of 10 um), such that "shape" information may remain, which may be the ratio of each sensor's value relative to the largest sensor value in the matrix array, such that the data from any first golden diagnostic orientation of a first golden diagnostic condition and from any second golden diagnostic orientation of a second golden diagnostic condition may be normalized, whereas the larger the difference between the two golden diagnostic orientations (e.g., the closer to a 180° difference between the two device diagnostic orientations) may provide lesser noisy data.

At any suitable moment, such as during assembly or initial calibration or testing of device 100 in a factory and/or during end user use of device 100 in the field or otherwise, a new device diagnostic condition FSM data set may be detected by force sensing assembly 114 of device 100 and then processed in combination with (e.g., compared to) any suitable golden diagnostic condition FSM data set from a golden unit in order to determine the viability of device 100 and/or to diagnose any issues with device 100. In some embodiments, a correlation factor between a golden diagnostic condition FSM data set and a device diagnostic condition FSM data set may be calculated and then such a calculated correlation factor may be compared to a threshold correlation factor for determining whether or not device 100 satisfies a viability standard. A correlation factor between two matrices may be calculated using any suitable mathematical formulas. As just one example, in order to calculate a golden correlation coefficient or golden correlation factor r between a golden diagnostic data matrix [Mg] of a golden diagnostic condition FSM data set of golden diagnostic data 107*b* any one of first golden diagnostic condition data matrix [Mg-c1], second golden diagnostic condition data matrix [Mg-c2], and delta golden diagnostic condition data matrix [Mg-Δ]) and a device diagnostic data matrix [Md] of a device diagnostic condition FSM data set of device diagnostic data 107*a* (e.g., any one of first device diagnostic condition data matrix [Md-c1], second device diagnostic condition data matrix [Md-c2], and delta device diagnostic condition data matrix [Md-Δ]), the following equation (3) may be used:

$$r = \frac{\sum_m \sum_n (A_{mn} - \overline{A})(B_{mn} - \overline{B})}{\sqrt{\left(\sum_m \sum_n (A_{mn} - \overline{A})^2\right)\left(\sum_m \sum_n (B_{mn} - \overline{B})^2\right)}}, \quad (3)$$

where A may be the m×n golden diagnostic data matrix [Mg], where B may be the m×n device diagnostic data matrix [Md], and where r may be the correlation factor between golden diagnostic data matrix [Mg] and device diagnostic data matrix [Md], and in which correlation factor r may have a value between 0 and 1 indicative of the similarity between golden diagnostic data matrix [Mg] and device diagnostic data matrix [Md] (e.g., the greater the similarity, the greater the value of correlation factor r (e.g., a correlation factor r with a value of 1 may be indicative of identical diagnostic data matrices, which may indicate that device 100 may be performing the same as and/or structurally identical to the golden unit)). A calculated correlation factor between a golden diagnostic condition FSM data set and a device diagnostic condition FSM data set may then be compared to a threshold correlation factor value 107c of diagnostic data 107 (e.g., a data value available to server 50 and/or memory 104 of device 100) in order to determine whether or not the device under test ("DUT") (i.e., device 100 in the context of this application) may satisfy a viability standard. For example, a threshold correlation factor value 107c may be defined (e.g., based on simulation and build distribution of the device type or otherwise) to be a value of 0.96 (or any other suitable value) and that threshold correlation factor value may be compared to a calculated value of correlation factor r between a golden diagnostic condition FSM data set and a device diagnostic condition FSM data set of DUT device 100 in order to determine whether or not DUT device 100 meets a similarity standard for that device type. For example, if a calculated value of correlation factor r between a golden diagnostic condition FSM data set of golden diagnostic data 107b and a detected device diagnostic condition FSM data set of device diagnostic data 107a of DUT device 100 meets (e.g., is greater than or equal to) a threshold correlation factor value 107c, then no further analysis of the device diagnostic condition FSM data set of device diagnostic data 107a of DUT device 100 may be performed and a process of diagnosing DUT device 100 may stop (e.g., at least until new device diagnostic condition FSM data set of device diagnostic data 107a may be detected for use in diagnosing DUT device 100), and the device may be diagnosed with a clean bill of health (e.g., suitable for end user use, at least according to this diagnosis process). In some embodiments, the threshold correlation factor value may vary based on the relationship between the type of golden diagnostic data matrix [Mg] and the type of device diagnostic data matrix [Md] used to calculate golden correlation factor r. For example, if the golden diagnostic data matrix [Mg] used is a delta golden diagnostic condition data matrix [Mg-Δ] using equation (2b) and if the device diagnostic data matrix [Md] used is a delta device diagnostic condition data matrix [Md-Δ] using equation (1b, then the threshold correlation factor value may be higher than if equation (2a) and/or (1a) were respectively used instead and/or if the golden diagnostic data matrix [Mg] used is a first golden diagnostic condition data matrix [Mg-c1] and if the device diagnostic data matrix [Md] used is a first device diagnostic condition data matrix [Md-c1], and/or the like where more noise may be present. In some embodiments, rather than using delta golden diagnostic condition data matrix [Mg-Δ] as the golden diagnostic data matrix [Mg] and rather than using delta device diagnostic condition data matrix [Md-Δ] as the device diagnostic data matrix [Md] for calculating golden correlation factor r, where the two orientations and/or the difference between the two orientations of the golden unit and that of the DUT device may differ from one another in any suitable manner (e.g., due to the qualities of equations (2a) and (2b)), first golden diagnostic condition data matrix [Mg-c1] may be used as the golden diagnostic data matrix [Mg] and first device diagnostic condition data matrix [Md-c1] may be used as the device diagnostic data matrix [Md] for calculating golden correlation factor r when the first golden diagnostic condition is the same as the first device diagnostic condition (e.g., no external force applied and the same orientation with respect to gravity is used).

In response to a determination that a calculated value of correlation factor r between a golden diagnostic condition FSM data set of golden diagnostic data 107b and a detected device diagnostic condition FSM data set of device diagnostic data 107a of DUT device 100 does not meet (e.g., is less than) a threshold correlation factor value 107c (e.g., in response to determining that DUT devices 100 fails a golden correlation test), then further analysis of the device diagnostic condition FSM data set of device diagnostic data 107a of DUT device 100 may be performed (e.g., by device 100, by server 50, or by a combination of the two) in order to diagnose one or more issues with DUT device 100 that may be causing the failed golden correlation test. Such analysis may include calculating a residual data set between a golden diagnostic condition FSM data set of a golden unit and a device diagnostic condition FSM data set of DUT device 100 and comparing such a residual data set to similar residual data sets of properly diagnosed devices to identify a proper diagnosis for DUT device 100. Alternatively, in some embodiments, such a determination of a residual data set between a new device diagnostic condition FSM data set and a golden diagnostic condition FSM data set for diagnostic purposes may be carried out without or at least independently from any results of any golden correlation test.

In some embodiments, a residual data set between a golden diagnostic condition FSM data set of a golden unit and a device diagnostic condition FSM data set of DUT device 100 may be calculated and then such a calculated residual data set may be analyzed in any suitable manner (e.g., compared to one or more other residual data sets from properly diagnosed DUT devices) for diagnosing DUT device 100. A residual data set between two matrices may be calculated using any suitable mathematical formulas. As just one example, in order to calculate a residual diagnostic data set between a golden diagnostic data matrix [Mg] of a golden diagnostic condition FSM data set of golden diagnostic data 107b (e.g., any one of first golden diagnostic condition data matrix [Mg-c1], second golden diagnostic condition data matrix [Mg-c2], and delta golden diagnostic condition data matrix [Mg-Δ]) and a device diagnostic data matrix [Md] of a device diagnostic condition FSM data set of device diagnostic data 107a (e.g., any one of first device diagnostic condition data matrix [Md-c1], second device diagnostic condition data matrix [Md-c2], and delta device diagnostic condition data matrix [Md-Δ]) that may be represented as an m×n DUT residual diagnostic data matrix [MRdut] for DUT device 100, the following equation (4) may be used:

$$[MRdut]=[Mg]-[Md]. \quad (4)$$

Alternatively, as just one other example, in order to calculate a residual diagnostic data set between a golden diagnostic data matrix [Mg] of a golden diagnostic condition FSM data set of golden diagnostic data 107b (e.g., any one of first golden diagnostic condition data matrix [Mg-c1], second golden diagnostic condition data matrix [Mg-c2], and delta golden diagnostic condition data matrix [Mg-Δ]) and a device diagnostic data matrix [Md] of a device diagnostic condition FSM data set of device diagnostic data 107*a* (e.g., any one of first device diagnostic condition data matrix [Md-c1], second device diagnostic condition data matrix [Md-c2], and delta device diagnostic condition data matrix [Md-Δ]) that may be represented as an m×n DUT residual diagnostic data matrix [MRdut] for DUT device 100, the following equation (5) may be used:

$$[MRdut]=[Mg]-([Md]^T[Md])^{-1}[Md]^T[Mg][Md], \quad (5)$$

where equation (5), unlike equation (4), may be operative to minimize or remove any difference between the amplitude of golden diagnostic data matrix [Mg] and the amplitude of device diagnostic data matrix [Md] (e.g., to achieve spatial amplitude matching between the golden diagnostic condition FSM data set of golden diagnostic data matrix [Mg] and the device diagnostic condition FSM data set of device diagnostic data matrix [Md] for calculating DUT residual diagnostic data matrix [MRdut] for DUT device 100), which may be useful when the golden diagnostic condition FSM data set of golden diagnostic data matrix [Mg] may be a delta golden diagnostic condition FSM data set that may be representative of the difference between the FSM data of a first golden diagnostic condition FSM data set and the FSM data of a second golden diagnostic condition FSM data set (e.g., where an amplitude of that delta golden diagnostic condition FSM data set of golden diagnostic data matrix [Mg] may be based on the difference between the first golden diagnostic orientation of the first golden diagnostic condition of the first golden diagnostic condition FSM data set and the second golden diagnostic orientation of the second golden diagnostic condition of the second golden diagnostic condition FSM data set) and/or when the device diagnostic condition FSM data set of device diagnostic data matrix [Md] may be a delta device diagnostic condition FSM data set that may be representative of the difference between the FSM data of a first device diagnostic condition FSM data set and the FSM data of a second device diagnostic condition FSM data set (e.g., where an amplitude of that delta device diagnostic condition FSM data set of device diagnostic data matrix [Md] may be based on the difference between the first device diagnostic orientation of the first device diagnostic condition of the first device diagnostic condition FSM data set and the second device diagnostic orientation of the second device diagnostic condition of the second device diagnostic condition FSM data set). Equation (5), unlike equation (4), may be operative to minimize or remove any difference between the amplitude of golden diagnostic data matrix [Mg] and the amplitude of device diagnostic data matrix [Md] (e.g., to achieve spatial amplitude matching between the golden diagnostic condition FSM data set of golden diagnostic data matrix [Mg] and the device diagnostic condition FSM data set of device diagnostic data matrix [Md] for calculating DUT residual diagnostic data matrix [MRdut] for DUT device 100). This may remove any baseline gap information (e.g., usually on the order of 500 um), which may be more like an offset, and may extract each force sensor assembly's movement due to inertial effect (e.g., usually on the order of 10 um), such that "shape" information may remain, which may be the ratio of each sensor's value relative to the largest sensor value in the matrix array, such that the data from any first diagnostic orientation and from any second diagnostic orientation of one or both diagnostic data matrix may be normalized, whereas the larger the difference between two diagnostic orientations (e.g., the closer to a 180° difference between two device orientations) may provide lesser noisy data.

Therefore, any two golden diagnostic conditions may be used to determine a delta golden diagnostic condition data matrix [Mg-Δ] and any two device diagnostic conditions may be used to determine a delta device diagnostic condition data matrix [Mg-Δ] when delta golden diagnostic condition data matrix [Mg-Δ] may be used as golden diagnostic data matrix [Mg] and when delta device diagnostic condition data matrix [Md-Δ] may be used as device diagnostic data matrix [Md] for use in calculating DUT residual diagnostic data matrix [MRdut] for DUT device 100 (e.g., the difference between the two golden diagnostic orientations of the two golden diagnostic conditions may be the same as, greater than, or less than the difference between the two device diagnostic orientations of the two device diagnostic conditions, and/or either or both of the two golden diagnostic orientations of the two golden diagnostic conditions may be different in any suitable magnitude from either or both of the two device diagnostic orientations of the two device diagnostic conditions). Alternatively, when first golden diagnostic condition data matrix [Mg-c1] may be used as golden diagnostic data matrix [Mg] and when first device diagnostic condition data matrix [Md-c1] may be used as device diagnostic data matrix [Md] for use in calculating DUT residual diagnostic data matrix [MRdut] for DUT device 100, it may be easier for future analysis of DUT residual diagnostic data matrix [MRdut] (e.g., analysis may not have to overcome significant noise) when the golden diagnostic condition of first golden diagnostic condition data matrix [Mg-c1] is the same or similar to the device diagnostic condition of first device diagnostic condition data matrix [Md-c1] (e.g., if the same or similar angle with respect to gravity is used for the first condition of the golden unit and DUT device 100).

Once such a DUT residual diagnostic data set or DUT residual diagnostic data matrix [MRdut] has been calculated for DUT device 100 between a golden diagnostic data matrix [Mg] of a golden diagnostic condition FSM data set of golden diagnostic data 107*b* and a device diagnostic data matrix [Md] of a device diagnostic condition FSM data set of device diagnostic data 107*a*, that calculated DUT residual diagnostic data matrix [MRdut] may then be analyzed in any suitable manner for diagnosing DUT device 100. As just one example, calculated DUT residual diagnostic data matrix [MRdut] of DUT device 100 may be compared to one or more diagnosed residual diagnostic data matrices (e.g., one or more diagnosed residual diagnostic data sets) of one or more properly diagnosed devices of the same device type as DUT device 100 in order to identify the most similar other residual diagnostic data matrix for diagnosing DUT device 100. For example, diagnostic data 107 may also include diagnosed residual data set data 107*d* (e.g., a data set available to server 50 and/or memory 104 of device 100), where diagnosed residual data set data 107*d* may include one or more diagnosed residual diagnostic data matrices (e.g., one or more diagnosed residual diagnostic data sets), such as N number of diagnosed residual diagnostic data sets respectively represented by N number of diagnosed residual diagnostic data matrices [MR1], [MR2], . . . , and [MRN]. In such embodiments, each one of diagnosed residual diagnostic data matrices [MR1] through [MRN] may have been calculated similarly to DUT residual diagnostic data matrix [MRdut] of DUT device 100 (e.g., using a golden diagnostic condition FSM data set and one of equations (4) and (5)), but, instead of being calculated using a device diagnostic condition FSM data set of a DUT device to be diagnosed (e.g., a device diagnostic condition FSM data set of device diagnostic data 107*a* of DUT device 100 to be diagnosed), each one of diagnosed residual diagnostic data matrices [MR1] through [MRN] may have been calculated using a device diagnostic condition FSM data set of a properly diagnosed device and a description of the proper diagnosis (e.g., a textual description and/or schematic illustration of the diagnosis) of that device may be linked to its respective one of diagnosed residual diagnostic data matrices [MR1] through [MRN] in diagnosed residual data set data 107d, where each diagnosed device may be of the same device type as DUT device 100 and/or may use the same golden diagnostic condition FSM data set to calculate its diagnostic data matrix. That is, first diagnosed residual diagnostic data matrix [MR1] of diagnosed residual data set data 107d may have been generated using a device diagnostic condition FSM data set detected from a force sensing assembly of a first diagnosed device DD1 of the same type as DUT device 100, where that first diagnosed device DD1 may be properly diagnosed (e.g., by a manufacturer or tester or other suitable entity) with a particular first device issue at the time its device diagnostic condition FSM data set was detected, and a description DI1 of that first device issue may be stored in conjunction with that first diagnosed residual diagnostic data matrix [MR1] as a first portion of diagnosed residual data set data 107d. Similarly, second diagnosed residual diagnostic data matrix [MR2] of diagnosed residual data set data 107d may have been generated using a device diagnostic condition FSM data set detected from a force sensing assembly of a second diagnosed device DD2 of the same type as DUT device 100, where that second diagnosed device DD2 may be properly diagnosed (e.g., by a manufacturer or tester or other suitable entity) with a particular second device issue at the time its device diagnostic condition FSM data set was detected, and a description DI2 of that second device issue may be stored in conjunction with that second diagnosed residual diagnostic data matrix [MR2] as a second portion of diagnosed residual data set data 107d. Moreover, Nth diagnosed residual diagnostic data matrix [MRN] of diagnosed residual data set data 107d may have been generated using a device diagnostic condition FSM data set detected from a force sensing assembly of an Nth diagnosed device DDN of the same type as DUT device 100, where that Nth diagnosed device DDN may be properly diagnosed (e.g., by a manufacturer or tester or other suitable entity) with a particular Nth device issue at the time its device diagnostic condition FSM data set was detected, and a description DIN of that Nth device issue may be stored in conjunction with that Nth diagnosed residual diagnostic data matrix [MRN] as an Nth portion of diagnosed residual data set data 107d. One, some, or each of the N properly diagnosed device issues of the N diagnosed devices DD1-DDN used to define diagnosed residual diagnostic data matrices [MR1] through [MRN] in diagnosed residual data set data 107d may be a different distinct diagnosed device issue that has been properly diagnosed to plague its diagnosed device solely (e.g., first diagnosed residual diagnostic data matrix [MR1] may have been generated by a first diagnosed device DD1 that may be properly diagnosed with only a first device issue of a ruffled flex of a camera device component of the first diagnosed device (e.g., similar to a camera input component 110c of FIGS. 1C-1E) but no other diagnosed device issues (e.g., first diagnosed device DD1 may be a golden unit except for including a ruffled camera component flex that may apply a certain type of force on the force sensing assembly of the first diagnosed device DD1 (e.g., as may occur after a device is dropped)), and description DI1 of that first device issue may be indicative (e.g., textually) of such a ruffled camera flex and may be stored in conjunction with that first diagnosed residual diagnostic data matrix [MR1] as a first portion of diagnosed residual data set data 107d). Alternatively or additionally, one, some, or each of the N properly diagnosed device issues of the N diagnosed devices DD1-DDN used to define diagnosed residual diagnostic data matrices [MR1] through [MRN] in diagnosed residual data set data 107d may be a combination of two or more distinct diagnosed device issues that have been properly diagnosed to plague its diagnosed device in combination (e.g., second diagnosed residual diagnostic data matrix [MR2] may have been generated by a second diagnosed device DD2 that may be properly diagnosed with both a device issue of a ruffled flex of a camera device component of the second diagnosed device DD2 and also another device issue of a mechanical misalignment between a back light unit ("BLU") of a light-emitting subassembly (e.g., similar to light-emitting subassembly 150 of device 100) and another portion (e.g., a housing or chassis or ring tape portion) of the second diagnosed device DD2 but no other diagnosed device issues (e.g., second diagnosed device DD2 may be a golden unit except for including a ruffled camera component flex that may apply a certain type of force on the force sensing assembly of the second diagnosed device and including mechanical misalignment involving a BLU that may apply a certain type of force on the force sensing assembly of the second diagnosed device), and description DI2 of that second device issue may be indicative (e.g., textually) of such a ruffled camera flex and such a BLU misalignment and may be stored in conjunction with that second diagnosed residual diagnostic data matrix [MR2] as a second portion of diagnosed residual data set data 107d).

As mentioned, once a DUT residual diagnostic data set or DUT residual diagnostic data matrix [MRdut] has been calculated for DUT device 100, that calculated DUT residual diagnostic data matrix [MRdut] may then be compared to one or more of diagnosed residual diagnostic data matrices [MR1] through [MRN] of diagnosed residual data set data 107d in order to identify a similar diagnostic data matrix for diagnosing DUT device 100. For example, in some embodiments, a residual correlation factor Rr between DUT residual diagnostic data matrix [MRdut] of DUT device 100 and each one of diagnosed residual diagnostic data matrices [MR1] through [MRN] of diagnosed residual data set data 107d may be determined (e.g., using equation (3) or any other suitable calculations), which, for example, may result in the determination of a first residual correlation factor Rr1 between DUT residual diagnostic data matrix [MRdut] of DUT device 100 and first diagnosed residual diagnostic data matrix [MR1] of first diagnosed device DD1, a second residual correlation factor Rr2 between DUT residual diagnostic data matrix [MRdut] of DUT device 100 and second diagnosed residual diagnostic data matrix [MR2] of second diagnosed device DD2, . . . , and an Nth residual correlation factor RrN between residual DUT diagnostic data matrix [MRdut] of DUT device 100 and Nth diagnosed residual diagnostic data matrix [MRN] of Nth diagnosed device DDN. Then the largest one of determined residual correlation factors Rr1 through RrN may be identified. Then the particular diagnosis description DI associated with the particular diagnosed residual diagnostic data matrix of matrices [MR1] through [MRN] generating the largest determined residual correlation factor Rr may be identified from diagnosed residual data set data 107d. Then that particular identified diagnosis description DI may be used to describe the diagnosis for DUT device 100. Some or all portions of such residual correlation factor Rr determination and diagnosis description identification for diagnosing DUT device 100 may be performed entirely by processing capabilities of DUT device 100 (e.g., by processor 102 that may access all suitable diagnosed residual data set data 107d from memory 104 and/or from server 50) or entirely by processing capabilities of server 50 (e.g., by a processor of server 50 that may access device diagnostic data matrix [Md] of a device diagnostic condition FSM data set of device diagnostic data 107a from device 100) or by any suitable combination of processing capabilities of device 100 and one or more servers 50 for arriving at a diagnosis for DUT device 100. Therefore, DUT device 100 alone (e.g., when data 107a-107d is locally stored on device 100 or accessible from remote server 50 by device 100) or in combination with server 50 may be operative to automatically diagnose DUT device 100 using a device diagnostic condition FSM data set (e.g., of device diagnostic data 107a) that may be representative of FSM data from one, some, or each sensor 144 of sensor array 142 of force sensing assembly 114 that may be detected automatically (e.g., without any end user interaction with DUT device 100 for contributing to the diagnosis), where such a diagnosis may then be presented to the user (e.g., via display assembly output component 112a (e.g., via a push notification)) with information that may be indicative of the issue(s) detected and/or next steps that ought to be taken to resolve the detected issue(s). Alternatively, diagnosed residual data set data 107d may include any suitable diagnosed diagnostic data matrix [Md-d] for each one of the N properly diagnosed devices (e.g., a first diagnosed diagnostic condition data matrix [Md-d-c1], a second diagnosed diagnostic condition data matrix [Md-d-c2], and/or a delta diagnosed diagnostic condition data matrix [Md-d-Δ] for each one of the N properly diagnosed devices), and a correlation factor may be determined between device diagnostic data matrix [Md] of DUT device 100 and such a diagnosed diagnostic data matrix [Md-d] for each one of the N properly diagnosed devices in order to identify the diagnosis of the properly diagnosed device whose diagnosed diagnostic data matrix [Md-d] revealed the highest correlation factor with device diagnostic data matrix [Md] of DUT device 100 in order to diagnose DUT device 100. In some embodiments, rather than any of such correlation factor comparing, any suitable neural network(s) and/or machine learning algorithm(s) may be used by system 1 to automatically identify a diagnosis for DUT device 100.

Figures 6A, 6B:
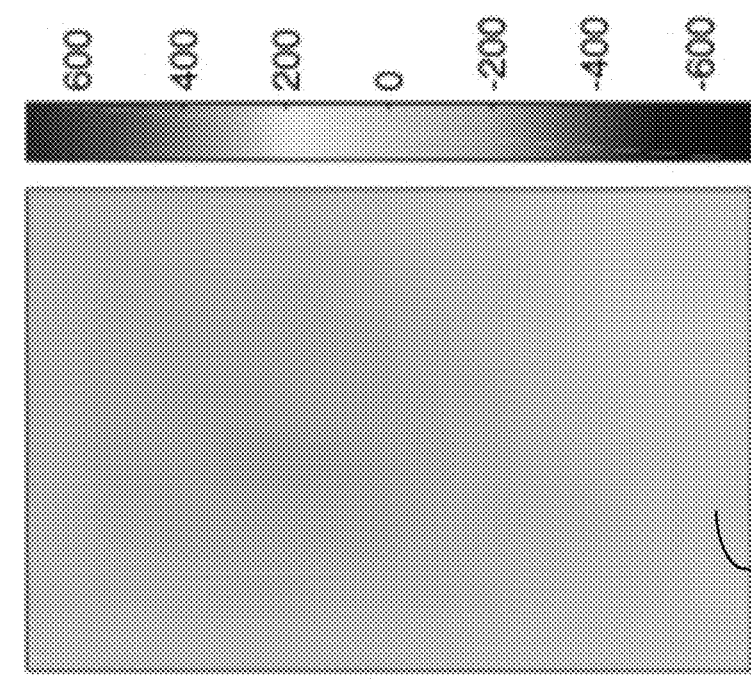

Alternatively, rather than processing capabilities of system 1 automatically identifying a diagnosis for DUT device 100, system 1 may be operative to present one or more certain maps to a human entity that may then study the map(s) to diagnose DUT device 100. For example, a display output component assembly of system 1 (e.g., display output component assembly 112a or a display output component assembly of server 50) may be operative to present a two-dimensional map (e.g., similar to two-dimensional map 300 of FIG. 3) and/or a three-dimensional map (e.g., similar to three-dimensional map 200 of FIG. 2) of DUT residual diagnostic data matrix [MRdut] of DUT device 100 to a human entity (e.g., an end user of device 100 and/or a worker at a device rehabilitation center (e.g., a tech support "Genius" at a retail store of Apple Inc. (e.g., at a "Genius Bar")), etc.), which may then be visually studied by that human entity in isolation or in combination with a presentation of a similar map of one or more of diagnosed residual diagnostic data matrices [MR1] through [MRN] of diagnosed residual data set data 107d and/or in combination with any other suitable data (e.g., a manual describing characteristics of maps of diagnostic data matrices for devices with various issues) in order to determine an appropriate diagnosis for DUT device 100. For example, in some embodiments, two-dimensional map 300 of FIG. 3 may be representative of a golden diagnostic data matrix [Mg], while a two-dimensional map 400a with data 409a of FIG. 4A may be representative of a device diagnostic data matrix [Md] of DUT device 100 with a first particular issue (e.g., a ruffled camera component flex that may apply a certain type of force on force sensing assembly 114 of DUT device 100), and while a two-dimensional map 400b with data 409b of FIG. 4B may be representative of a DUT residual diagnostic data matrix [MRdut] of DUT device 100 with that particular issue, where top-right interference of map 400b may be indicative of such a first particular issue (e.g., a ruffled camera component flex). As another example, in some embodiments, two-dimensional map 300 of FIG. 3 may be representative of a golden diagnostic data matrix [Mg], while a two-dimensional map 500a with data 509a of FIG. 5A may be representative of a device diagnostic data matrix [Md] of DUT device 100 with a second particular issue (e.g., a swollen battery that may apply a certain type of force on force sensing assembly 114 of DUT device 100), and while a two-dimensional map 500b with data 509b of FIG. 5B may be representative of a DUT residual diagnostic data matrix [MRdut] of DUT device 100 with that particular issue, where top-left interference of map 500b may be indicative of such a second particular issue (e.g., a swollen battery). As yet another example, in some embodiments, two-dimensional map 300 of FIG. 3 may be representative of a golden diagnostic data matrix [Mg], while a two-dimensional map 600a with data 609a of FIG. 6A may be representative of a DUT device diagnostic data matrix [Md] of DUT device 100 with a third particular issue (e.g., interference between a display flex (e.g., any suitable portion of display selection subassembly 160 and/or of touch sensing subassembly 170) and an integrated circuit of device 100 that may apply a certain type of force on force sensing assembly 114 of DUT device 100), and while a two-dimensional map 600b with data 609b of FIG. 6B may be representative of a DUT residual diagnostic data matrix [MRdut] of DUT device 100 with that particular issue, where bottom-right interference of map 600b may be indicative of such a third particular issue (e.g., display flex interference). As yet another example, in some embodiments, two-dimensional map 300 of FIG. 3 may be representative of a golden diagnostic data matrix [Mg], while a two-dimensional map 700a with data 709a of FIG. 7A may be representative of a device diagnostic data matrix [Md] of DUT device 100 with a fourth particular issue (e.g., mechanical misalignment or interlock failure between a BLU of light-emitting subassembly 150 and another portion (e.g., a housing or chassis or ring tape portion) of device 100 that may apply a certain type of force on force sensing assembly 114 of DUT device 100), and while a two-dimensional map 700b with data 609b of FIG. 7B may be representative of a DUT residual diagnostic data matrix [MRdut] of DUT device 100 with that particular issue, where top-center interference of map 700b may be indicative of such a fourth particular issue (e.g., mechanical misalignment or interlock failure). It is to be noted that the range of FSM values may be between −600 and +600 for golden diagnostic data matrix [Mg] in FIG. 3 and for device diagnostic data matrix [Md] in each one of FIGS. 4A, 5A, 6A, and 7A, while the range of FSM values may be between −200 and +200 for DUT residual diagnostic data matrix [MRdut] in each one of FIGS. 4B, 5B, 6B, and 7B, where the difference in ranges may be due to the effects of equation (5).

Detection of device diagnostic data 107a (e.g., determination of a new device diagnostic condition FSM data set) of DUT device 100 for use in determining a correlation factor between that new device diagnostic condition FSM data set and a golden diagnostic condition FSM data set or for any other purpose (e.g., for determining a residual shape between that new device diagnostic condition FSM data set and a golden diagnostic condition FSM data set for diagnostic purposes) may occur at any suitable moment including, but not limited to, device 100 or server 50 receiving a specific user instruction to do so (e.g., in a factory or via an end user interface on device 100 or otherwise when an entity determines that such analysis ought to be carried out (e.g., in response to DUT device 100 performing poorly)), automatically on a periodic basis (e.g., every 90 days), or upon any other suitable event, where such detection may be achieved similarly to detection of new device calibration condition FSM data of calibration data 105a described herein. As just one particular example, detection of new device diagnostic data 107a (e.g., determination of a new device diagnostic condition FSM data set) for use in determining a correlation factor or residual shape between that new device diagnostic condition FSM data set and a golden diagnostic condition FSM data set may be carried out in a factory after assembling DUT device 100 but before shipping DUT device 100 to an end user (e.g., after positioning force sensing assembly 114 within housing 101 and fixing input surface component 120 to another portion of DUT device 100 (e.g., within opening 109), which may then prevent an observer from visually checking the position and condition of certain device components internal to housing 101 (e.g., from visually identifying any unwanted mechanical interferences between internal device components), and which may thus cause an observer to rely on other methods of analyzing the viability of assembled DUT device 100). As another particular example, detection of new device diagnostic data 107a (e.g., determination of a new device diagnostic condition FSM data set) for use in determining a correlation factor or residual shape between that new device diagnostic condition FSM data set and a golden diagnostic condition FSM data set may be carried out after device 100 has been provided to and used by an end user (e.g., in the field of an end user or in a repair shop) once poor performance of DUT device 100 has been noticed (e.g., by the end user) when it may be difficult to identify a structural or other suitable issue inside housing 101. For example, due to one of many possible situations during end user use of DUT device 100, a battery power supply component 108a of device 100 may swell (e.g., a common problem for a battery after battery cycling) from an initial proper size with a height H1 of FIGS. 1C and 1D that may not exert any force on force sensing assembly 114 to a swelled size with a height H2 of FIG. 1E that may exert a force on force sensing assembly 114 (e.g., even absent any external force provided by user U on external surface 121 of force sensing assembly 114). However, such a battery swell may not be detectable visually by an end user or even by a trained worker at a device rehabilitation center (e.g., due to battery power supply component 108a being hidden internal to housing 101). Instead, determination of a new device diagnostic condition FSM data set from force sensing assembly 114 of DUT device 100 during a device condition of FIG. 1E may be used for determining a correlation factor between that new device diagnostic condition FSM data set and a golden diagnostic condition FSM data set or for determining a residual shape (e.g., DUT residual diagnostic data matrix [MRdut] of DUT device 100) between that new device diagnostic condition FSM data set and a golden diagnostic condition FSM data set for diagnosing DUT device 100. Therefore, such determination and use of a new device diagnostic condition FSM data set from force sensing assembly 114 of DUT device 100 during the device condition of FIG. 1E may act as a sort of "X-ray" of the internal components of DUT device 100 for potentially diagnosing an issue with such internal components (e.g., a DUT residual diagnostic data matrix [MRdut] of DUT device 100 detected during a device condition of FIG. 1E may be determined to most closely correlate with Nth diagnosed residual diagnostic data matrix [MRN] of diagnosed residual data set data 107d that may have been generated by Nth diagnosed device DDN that may be properly diagnosed with only an Nth device issue of a swollen battery similar to the swollen battery of FIG. 1E).

Figure 10:
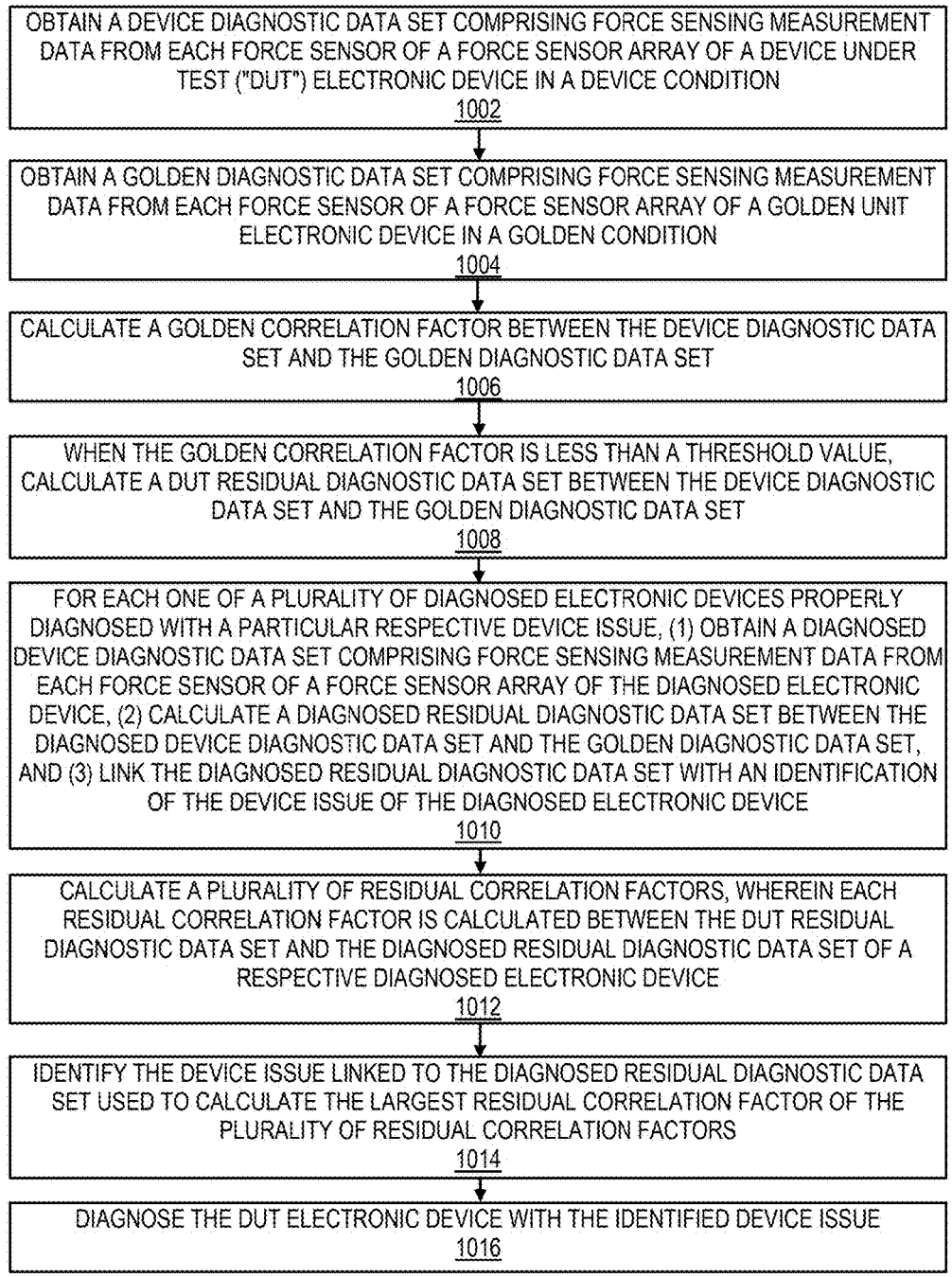

FIG. 10 is a flowchart of an illustrative process 1000 for diagnosing a device under test ("DUT") electronic device using a force sensing assembly of the DUT electronic device. At step 1002 of process 1000, a device diagnostic data set including force sensing measurement data from each force sensor of a force sensor array of the force sensing assembly of the DUT electronic device in a device condition may be obtained (e.g., any one of a first device diagnostic condition FSM data set, a second device diagnostic condition FSM data set, and a delta device diagnostic condition FSM data set of device diagnostic data 107a providing a device diagnostic data matrix [Md] may be obtained). At step 1004 of process 1000, a golden diagnostic data set including force sensing measurement data from each force sensor of a force sensor array of a force sensing assembly of a golden unit electronic device in a golden condition may be obtained (e.g., any one of a first golden diagnostic condition FSM data set, a second golden diagnostic condition FSM data set, and a delta golden diagnostic condition FSM data set of golden diagnostic data 107b providing a golden diagnostic data matrix [Mg] may be obtained). At step 1006 of process 1000, a golden correlation factor between the device diagnostic data set and the golden diagnostic data set may be calculated (e.g., golden correlation factor r between a golden diagnostic data matrix [Mg] of a golden diagnostic condition FSM data set of golden diagnostic data 107b and a device diagnostic data matrix [Md] of a device diagnostic condition FSM data set of device diagnostic data 107a may be calculated using equation (3) or any other suitable calculation(s)). At step 1008 of process 1000, when the golden correlation factor is less than a threshold value, a DUT residual diagnostic data set between the device diagnostic data set and the golden diagnostic data set may be calculated (e.g., when golden correlation factor r is less than a threshold (e.g., 0.96), a DUT residual diagnostic data set may be calculated between a golden diagnostic data matrix [Mg] of a golden diagnostic condition FSM data set of golden diagnostic data 107b and a device diagnostic data matrix [Md] of a device diagnostic condition FSM data set of device diagnostic data 107a that may be represented as an m×n DUT residual diagnostic data matrix [MRdut] for DUT device 100 (e.g., using equation (4) or equation (5) or any other suitable calculation(s))). At step 1010 of process 1000, for each one of a plurality of diagnosed electronic devices properly diagnosed with a particular respective device issue, (1) a diagnosed device diagnostic data set including force sensing measurement data from each force sensor of a force sensor array of the diagnosed electronic device may be obtained, (2) a diagnosed residual diagnostic data set between the diagnosed device diagnostic data set and the golden diagnostic data set may be calculated, and (3) the diagnosed residual diagnostic data set may be linked with an identification of the device issue of the diagnosed electronic device (e.g., diagnosed residual data set data 107d may include one or more diagnosed residual diagnostic data matrices (e.g., one or more diagnosed residual diagnostic data sets), such as N number of diagnosed residual diagnostic data sets respectively represented by N number of diagnosed residual diagnostic data matrices [MR1], [MR2], . . . , and [MRN], where each one of diagnosed residual diagnostic data matrices [MR1] through [MRN] may have been calculated similarly to DUT residual diagnostic data matrix [MRdut] of DUT device 100 (e.g., using a golden diagnostic condition FSM data set and one of equations (4) and (5)), but, instead of being calculated using a device diagnostic condition FSM data set of a DUT device to be diagnosed (e.g., a device diagnostic condition FSM data set of device diagnostic data 107a of DUT device 100 to be diagnosed), each one of diagnosed residual diagnostic data matrices [MR1] through [MRN] may be calculated using a device diagnostic condition FSM data set of a properly diagnosed device and a description of the proper diagnosis (e.g., a textual description and/or schematic illustration of the diagnosis) of that device may be linked to its respective one of diagnosed residual diagnostic data matrices [MR1] through [MRN] in diagnosed residual data set data 107d, where each diagnosed device may be of the same device type as DUT device 100 and/or may use the same golden diagnostic condition FSM data set to calculate its diagnostic data matrix). At step 1012 of process 1000, a plurality of residual correlation factors may be calculated, wherein each residual correlation factor may be calculated between the DUT residual diagnostic data set and the diagnosed residual diagnostic data set of a respective diagnosed electronic device (e.g., a residual correlation factor Rr between DUT residual diagnostic data matrix [MRdut] of DUT device 100 and each one of diagnosed residual diagnostic data matrices [MR1] through [MRN] of diagnosed residual data set data 107d may be determined (e.g., using equation (1) or any other suitable calculation(s))). At step 1014 of process 1000, the device issue linked to the diagnosed residual diagnostic data set used to calculate the largest residual correlation factor of the plurality of residual correlation factors may be identified (e.g., the largest one of determined residual correlation factors Rr1 through RrN may be identified and then the particular diagnosis description DI associated with the particular diagnosed residual diagnostic data matrix of matrices [MR1] through [MRN] generating the largest determined residual correlation factor Rr may be identified from diagnosed residual data set data 107d). At step 1016 of process 1000, the DUT electronic device may be diagnosed with the identified device issue (e.g., the particular identified diagnosis description DI may be used to describe the diagnosis for DUT device 100).

It is understood that the steps shown in process 1000 of FIG. 10 are only illustrative and that existing steps may be modified or omitted, additional steps may be added, and the order of certain steps may be altered.

FIG. 11 is a flowchart of an illustrative process 1000 for diagnosing a device under test ("DUT") electronic device using a force sensing assembly of the DUT electronic device. At step 1102 of process 1100, a first DUT device diagnostic data set may be obtained that includes first DUT force sensing measurement data from each force sensor of a force sensor array of the force sensing assembly of the DUT electronic device in a first DUT device condition, wherein the first DUT device condition includes the force sensing assembly of the DUT electronic device being oriented at a first angle with respect to gravity (e.g., a first device diagnostic condition FSM data set (e.g., a first device diagnostic condition data matrix [Md-c1]) may be obtained). At step 1104 of process 1100, a second DUT device diagnostic data set may be obtained that includes second DUT force sensing measurement data from each force sensor of the force sensor array of the force sensing assembly of the DUT electronic device in a second DUT device condition, wherein the second DUT device condition includes the force sensing assembly of the DUT electronic device being oriented at a second angle with respect to gravity that is different than the first angle by a DUT device difference (e.g., a second device diagnostic condition FSM data set (e.g., a second device diagnostic condition data matrix [Md-c2]) may be obtained). At step 1106 of process 1100, a delta DUT device diagnostic data set may be obtained that includes the difference between the first DUT device diagnostic data set and the second DUT device diagnostic data set (e.g., a delta device diagnostic condition FSM data set (e.g., a delta device diagnostic condition data matrix [Md-Δ]) may be obtained). At step 1108 of process 1100, the DUT electronic device may be diagnosed using the delta DUT device diagnostic data set (e.g., delta device diagnostic condition data matrix [Md-Δ] may be used to diagnose DUT device 100).

It is understood that the steps shown in process 1100 of FIG. 11 are only illustrative and that existing steps may be modified or omitted, additional steps may be added, and the order of certain steps may be altered.

Figure 12:
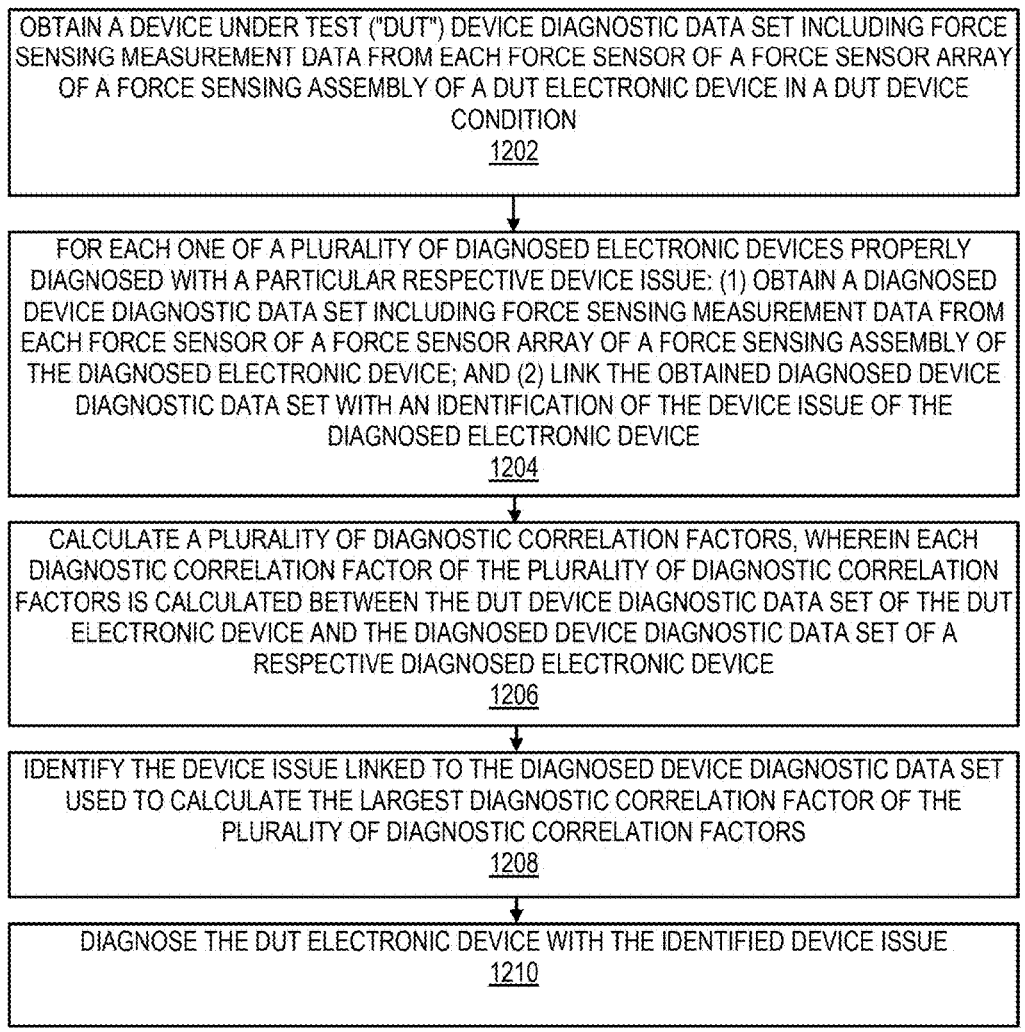

FIG. 12 is a flowchart of an illustrative process 1200 for diagnosing a device under test ("DUT") electronic device using a force sensing assembly of the DUT electronic device. At step 1202 of process 1200, a DUT device diagnostic data set may be obtained that includes force sensing measurement data from each force sensor of a force sensor array of the force sensing assembly of the DUT electronic device in a DUT device condition (e.g., a device diagnostic condition FSM data set (e.g., a device diagnostic condition data matrix [Md]) may be obtained). At step 1204 of process 1200, for each one of a plurality of diagnosed electronic devices properly diagnosed with a particular respective device issue, (1) a diagnosed device diagnostic data set may be obtained that includes force sensing measurement data from each force sensor of a force sensor array of a force sensing assembly of the diagnosed electronic device and (2) the obtained diagnosed device diagnostic data set may be linked with an identification of the device issue of the diagnosed electronic device (e.g., diagnosed residual data set data 107d may include one or more diagnosed residual diagnostic data matrices (e.g., one or more diagnosed residual diagnostic data sets), such as N number of diagnosed diagnostic data sets respectively represented by N number of diagnosed diagnostic data matrices, where each one of diagnosed diagnostic data matrices may be calculated similarly to DUT diagnostic data matrix [Md] or [MRdut] of DUT device 100, but, instead of being calculated using a device diagnostic condition FSM data set of a DUT device to be diagnosed (e.g., a device diagnostic condition FSM data set of device diagnostic data 107a of DUT device 100 to be diagnosed), each one of the diagnosed diagnostic data matrices may be calculated using a device diagnostic condition FSM data set of a properly diagnosed device and a description of the proper diagnosis (e.g., a textual description and/or schematic illustration of the diagnosis) of that device may be linked to its respective one of diagnosed diagnostic data matrices, where each diagnosed device may be of the same device type as DUT device 100). At step 1206 of process 1200, a plurality of diagnostic correlation factors may be calculated, wherein each diagnostic correlation factor of the plurality of diagnostic correlation factors is calculated between the DUT device diagnostic data set of the DUT electronic device and the diagnosed device diagnostic data set of a respective diagnosed electronic device (e.g., using equation (3)). At step 1208 of process 1200, the device issue linked to the diagnosed device diagnostic data set used to calculate the largest diagnostic correlation factor of the plurality of diagnostic correlation factors may be identified (e.g., the largest one of determined correlation factors Rr1 through RrN may be identified and then the particular diagnosis description DI associated with the particular diagnosed diagnostic data matrix of matrices [MR1] through [MRN] generating the largest determined correlation factor Rr may be identified from diagnosed data set data 107*d*). At step 1210 of process 1200, the DUT electronic device may be diagnosed with the identified device issue (e.g., the particular identified diagnosis description DI may be used to describe the diagnosis for DUT device 100).

It is understood that the steps shown in process 1200 of FIG. 12 are only illustrative and that existing steps may be modified or omitted, additional steps may be added, and the order of certain steps may be altered.

One, some, or all of the processes described with respect to FIGS. 1-12 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a compact disc (e.g., compact disc ("CD")-ROM), a digital versatile disk ("DVD"), a magnetic tape, a removable memory card, and a data storage device (e.g., memory 104 of FIG. 1). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol (e.g., the computer-readable medium may be communicated from a remote device or server 50 as data 55 to electronic device 100 via communications component 106 (e.g., as at least a portion of an application 103). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or element or subsystem of system 1 may be provided as a software construct, firmware construct, one or more hardware components, or a combination thereof. For example, any, each, or at least one module or component or element or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and elements and subsystems of system 1 are only illustrative, and that the number, configuration, functionality, and interconnection of existing modules, components, elements, and/or subsystems of system 1 may be modified or omitted, additional modules, components, elements, and/or subsystems of system 1 may be added, and the interconnection of certain modules, components, elements, and/or subsystems of system 1 may be altered.

At least a portion of one or more of the modules or components or elements or subsystems of system 1 may be stored in or otherwise accessible to an entity of system 1 in any suitable manner (e.g., in memory 104 of device 100 (e.g., as at least a portion of an application 103) or in a memory of server 50). For example, any or each module of system 1 may be implemented using any suitable technologies (e.g., as one or more integrated circuit devices), and different modules may or may not be identical in structure, capabilities, and operation. Any or all of the modules or other components of system 1 may be mounted on an expansion card, mounted directly on a system motherboard, or integrated into a system chipset component (e.g., into a "north bridge" chip).

Any or each module or component of system 1 may be a dedicated system implemented using one or more expansion cards adapted for various bus standards. For example, all of the modules may be mounted on different interconnected expansion cards or all of the modules may be mounted on one expansion card. With respect to device 100, by way of example only, any one or more of the modules of device 100 may interface with a motherboard or processor 102 of device 100 through an expansion slot (e.g., a peripheral component interconnect ("PCI") slot or a PCI express slot). Alternatively, any one or more of the modules of device 100 need not be removable but may include one or more dedicated modules that may include memory (e.g., RAM) dedicated to the utilization of the module. In other embodiments, any one or more of the modules of system 1 may be integrated into device 100. For example, any intelligence that may be associated with one or more of components system 1 may utilize a portion of device memory 104 of device 100. Any or each element or module or component of device 100 may include its own processing circuitry and/or memory. Alternatively, any or each module or component of system 1 may share processing circuitry and/or memory with any other module of system 1.

While there have been described systems, methods, and computer-readable media for diagnosing an electronic device using a force sensing assembly, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the concepts of the disclosure can be practiced by other than the described embodiments, which are presented for purposes of illustration rather than of limitation.

What is claimed is:

1. A method for diagnosing a device under test ("DUT") electronic device using a force sensing assembly of the DUT electronic device comprising:
   obtaining a first DUT device diagnostic data set comprising first DUT force sensing measurement data from each force sensor of a force sensor array of the force sensing assembly of the DUT electronic device in a first DUT device condition, wherein the first DUT device condition comprises the force sensing assembly of the DUT electronic device being oriented at a first angle with respect to gravity;
   obtaining a second DUT device diagnostic data set comprising second DUT force sensing measurement data from each force sensor of the force sensor array of the force sensing assembly of the DUT electronic device in a second DUT device condition, wherein the second DUT device condition comprises the force sensing assembly of the DUT electronic device being oriented at a second angle with respect to gravity that is different than the first angle by a DUT device difference;
   obtaining a delta DUT device diagnostic data set comprising the difference between the first DUT device diagnostic data set and the second DUT device diagnostic data set; and
   diagnosing the DUT electronic device using the delta DUT device diagnostic data set, wherein, when the delta DUT device diagnostic data set is null, the diagnosing comprises diagnosing the force sensing assembly of the DUT electronic device to comprise faulty hardware.

2. The method of claim 1, further comprising determining that the force sensing assembly of the DUT electronic device is in the first DUT device condition using touch data from a touch sensor assembly of the DUT electronic device, wherein the obtaining the first DUT device diagnostic data set comprises obtaining the first DUT device diagnostic data set in response to the determining.

3. The method of claim 1, further comprising determining that the force sensing assembly of the DUT electronic device is in the first DUT device condition using orientation sensor data from an orientation sensor assembly of the DUT electronic device, wherein the obtaining the first DUT device diagnostic data set comprises obtaining the first DUT device diagnostic data set in response to the determining.

4. The method of claim 1, wherein the diagnosing occurs when the DUT electronic device is in the possession of an end user of the DUT electronic device.

5. The method of claim 1, further comprising:
   for each one of a plurality of diagnosed electronic devices properly diagnosed with a particular respective device issue:
      obtaining a diagnosed device diagnostic data set comprising force sensing measurement data from each force sensor of a plurality of force sensors of a force sensing assembly of the diagnosed electronic device; and
      linking the obtained diagnosed device diagnostic data set with an identification of the device issue of the diagnosed electronic device;
   calculating a plurality of diagnostic correlation factors, wherein each diagnostic correlation factor of the plurality of diagnostic correlation factors is calculated between the delta DUT device diagnostic data set of the DUT electronic device and the diagnosed device diagnostic data set of a respective diagnosed electronic device; and
   identifying the device issue linked to the diagnosed device diagnostic data set used to calculate the largest diagnostic correlation factor of the plurality of diagnostic correlation factors, wherein the diagnosing comprises diagnosing the DUT electronic device with the identified device issue.

6. The method of claim 1, wherein the DUT device difference is 180 degrees.

7. A method for diagnosing a device under test ("DUT") electronic device using a force sensing assembly of the DUT electronic device comprising:
   obtaining a first DUT device diagnostic data set comprising first DUT force sensing measurement data from each force sensor of a force sensor array of the force sensing assembly of the DUT electronic device in a first DUT device condition, wherein the first DUT device condition comprises the force sensing assembly of the DUT electronic device being oriented at a first angle with respect to gravity;
   obtaining a second DUT device diagnostic data set comprising second DUT force sensing measurement data from each force sensor of the force sensor array of the force sensing assembly of the DUT electronic device in a second DUT device condition, wherein the second DUT device condition comprises the force sensing assembly of the DUT electronic device being oriented at a second angle with respect to gravity that is different than the first angle by a DUT device difference;
   obtaining a delta DUT device diagnostic data set comprising the difference between the first DUT device diagnostic data set and the second DUT device diagnostic data set;
   diagnosing the DUT electronic device using the delta DUT device diagnostic data set; and
   determining that the force sensing assembly of the DUT electronic device is in the first DUT device condition using orientation sensor data from an orientation sensor assembly of the DUT electronic device and using touch data from a touch sensor assembly of the DUT electronic device, wherein the obtaining the first DUT device diagnostic data set comprises obtaining the first DUT device diagnostic data set in response to the determining.

8. The method of claim 7, wherein the DUT device difference is 180 degrees.

9. The method of claim 7, wherein the diagnosing occurs when the DUT electronic device is in the possession of an end user of the DUT electronic device.

10. The method of claim 7, further comprising:
   for each one of a plurality of diagnosed electronic devices properly diagnosed with a particular respective device issue:
      obtaining a diagnosed device diagnostic data set comprising force sensing measurement data from each force sensor of a plurality of force sensors of a force sensing assembly of the diagnosed electronic device; and
      linking the obtained diagnosed device diagnostic data set with an identification of the device issue of the diagnosed electronic device;
   calculating a plurality of diagnostic correlation factors, wherein each diagnostic correlation factor of the plurality of diagnostic correlation factors is calculated between the delta DUT device diagnostic data set of the DUT electronic device and the diagnosed device diagnostic data set of a respective diagnosed electronic device; and identifying the device issue linked to the diagnosed device diagnostic data set used to calculate the largest diagnostic correlation factor of the plurality of diagnostic correlation factors, wherein the diagnosing comprises diagnosing the DUT electronic device with the identified device issue.

11. The method of claim 10, wherein, for at least one of the plurality of diagnosed electronic devices, the obtaining the diagnosed device diagnostic data set comprises:
   obtaining a first diagnosed device diagnostic data set comprising first diagnosed force sensing measurement data from each force sensor of the plurality of force sensors of the force sensing assembly of the diagnosed electronic device in a first diagnosed device condition, wherein the first diagnosed device condition comprises the force sensing assembly of the diagnosed electronic device being oriented at a third angle with respect to gravity;
   obtaining a second diagnosed device diagnostic data set comprising second diagnosed force sensing measurement data from each force sensor of the plurality of force sensors of the force sensing assembly of the diagnosed electronic device in a second diagnosed device condition, wherein the second diagnosed device condition comprises the force sensing assembly of the diagnosed electronic device being oriented at a fourth angle with respect to gravity that is different than the third angle by a diagnosed device difference; and
   obtaining a delta diagnosed device diagnostic data set comprising the difference between the first diagnosed device diagnostic data set and the second diagnosed device diagnostic data set, wherein the delta diagnosed device diagnostic data set is the diagnosed device diagnostic data set.

12. A method for diagnosing a device under test ("DUT") electronic device using a force sensing assembly of the DUT electronic device comprising:
   obtaining a first DUT device diagnostic data set comprising first DUT force sensing measurement data from each force sensor of a force sensor array of the force sensing assembly of the DUT electronic device in a first DUT device condition, wherein the first DUT device condition comprises the force sensing assembly of the DUT electronic device being oriented at a first angle with respect to gravity;
   obtaining a second DUT device diagnostic data set comprising second DUT force sensing measurement data from each force sensor of the force sensor array of the force sensing assembly of the DUT electronic device in a second DUT device condition, wherein the second DUT device condition comprises the force sensing assembly of the DUT electronic device being oriented at a second angle with respect to gravity that is different than the first angle by a DUT device difference;
   obtaining a delta DUT device diagnostic data set comprising the difference between the first DUT device diagnostic data set and the second DUT device diagnostic data set;
   diagnosing the DUT electronic device using the delta DUT device diagnostic data set;
   obtaining a golden diagnostic data set comprising force sensing measurement data from each force sensor of a force sensor array of a force sensing assembly of a golden unit electronic device;
   calculating a golden correlation factor between the delta DUT device diagnostic data set and the golden diagnostic data set; and
   comparing the golden correlation factor to a threshold value.

13. The method of claim 12, further comprising determining that the force sensing assembly of the DUT electronic device is in the first DUT device condition using orientation sensor data from an orientation sensor assembly of the DUT electronic device, wherein the obtaining the first DUT device diagnostic data set comprises obtaining the first DUT device diagnostic data set in response to the determining.

14. The method of claim 12, wherein the DUT device difference is 180 degrees.

15. The method of claim 12, wherein, when the comparing comprises determining that the golden correlation factor is less than the threshold value, the method further comprises:
   for each one of a plurality of diagnosed electronic devices properly diagnosed with a particular respective device issue:
      obtaining a diagnosed device diagnostic data set comprising force sensing measurement data from each force sensor of a force sensor array of a force sensing assembly of the diagnosed electronic device; and
      linking the obtained diagnosed device diagnostic data set with an identification of the device issue of the diagnosed electronic device;
   calculating a plurality of diagnostic correlation factors, wherein each diagnostic correlation factor of the plurality of diagnostic correlation factors is calculated between one of the first, second, or delta DUT device diagnostic data sets of the DUT electronic device and the diagnosed device diagnostic data set of a respective diagnosed electronic device;
   identifying the device issue linked to the diagnosed device diagnostic data set used to calculate the largest diagnostic correlation factor of the plurality of diagnostic correlation factors; and
   diagnosing the DUT electronic device with the identified device issue.

16. The method of claim 12, wherein, when the comparing comprises determining that the golden correlation factor is more than the threshold value, the diagnosing comprises diagnosing the DUT electronic device as suitable for end user use.

17. The method of claim 12, further comprising determining that the force sensing assembly of the DUT electronic device is in the first DUT device condition using touch data from a touch sensor assembly of the DUT electronic device, wherein the obtaining the first DUT device diagnostic data set comprises obtaining the first DUT device diagnostic data set in response to the determining.

18. The method of claim 12, wherein, when the comparing comprises determining that the golden correlation factor is less than the threshold value, the method further comprises:
   for each one of a plurality of diagnosed electronic devices properly diagnosed with a particular respective device issue:
      obtaining a diagnosed device diagnostic data set comprising force sensing measurement data from each force sensor of a plurality of force sensors of a force sensing assembly of the diagnosed electronic device; and
      linking the obtained diagnosed device diagnostic data set with an identification of the device issue of the diagnosed electronic device;

calculating a plurality of diagnostic correlation factors, wherein each diagnostic correlation factor of the plurality of diagnostic correlation factors is calculated between the delta DUT device diagnostic data set of the DUT electronic device and the diagnosed device diagnostic data set of a respective diagnosed electronic device; and identifying the device issue linked to the diagnosed device diagnostic data set used to calculate the largest diagnostic correlation factor of the plurality of diagnostic correlation factors, wherein the diagnosing comprises diagnosing the DUT electronic device with the identified device issue.

19. The method of claim 12, further comprising:

when the comparing comprises determining that the golden correlation factor is less than the threshold value, calculating a DUT residual diagnostic data set between the delta DUT device diagnostic data set of the DUT electronic device and the golden diagnostic data set;

for each one of a plurality of diagnosed electronic devices properly diagnosed with a particular respective device issue:

obtaining a diagnosed device diagnostic data set comprising force sensing measurement data from each force sensor of a plurality of force sensors of a force sensing assembly of the diagnosed electronic device;

calculating a diagnosed residual diagnostic data set between the diagnosed device diagnostic data set and the golden diagnostic data set; and linking the diagnosed residual diagnostic data set with an identification of the device issue of the diagnosed electronic device;

calculating a plurality of residual correlation factors, wherein each residual correlation factor is calculated between the DUT residual diagnostic data set and the diagnosed residual diagnostic data set of a respective diagnosed electronic device; and identifying the device issue linked to the diagnosed residual diagnostic data set used to calculate the largest residual correlation factor of the plurality of residual correlation factors, wherein the diagnosing comprises diagnosing the DUT electronic device with the identified device issue.

20. The method of claim 12, wherein the diagnosing occurs when the DUT electronic device is in the possession of an end user of the DUT electronic device.

* * * * *

UNITED STATES PATENT AND TRADEMARK OFFICE
CERTIFICATE OF CORRECTION

PATENT NO. : 10,101,841 B2
APPLICATION NO. : 15/257671
DATED : October 16, 2018
INVENTOR(S) : Li et al.

Page 1 of 1

It is certified that error appears in the above-identified patent and that said Letters Patent is hereby corrected as shown below:

In the Specification

In Column 19, Line 44, delete "in" and insert -- m --, therefor.

In Column 19, Line 45, delete "in" and insert -- m --, therefor.

Signed and Sealed this
Twenty-sixth Day of May, 2020

Andrei Iancu
*Director of the United States Patent and Trademark Office*